(12) United States Patent
Armitage

(10) Patent No.: US 9,684,877 B2
(45) Date of Patent: Jun. 20, 2017

(54) SYSTEM AND METHOD FOR IMPROVED CONSUMPTION MODELS FOR ANALYTICS

(71) Applicant: SAP AG, Walldorf (DE)

(72) Inventor: John Armitage, Palo Alto, CA (US)

(73) Assignee: SAP SE, Walldorf (DE)

( * ) Notice: Subject to any disclaimer, the term of this patent is extended or adjusted under 35 U.S.C. 154(b) by 396 days.

(21) Appl. No.: 13/622,274

(22) Filed: Sep. 18, 2012

(65) Prior Publication Data

US 2014/0082540 A1   Mar. 20, 2014

(51) Int. Cl.
*G06F 17/00* (2006.01)
*G06Q 10/04* (2012.01)

(52) U.S. Cl.
CPC ................... *G06Q 10/04* (2013.01)

(58) Field of Classification Search
CPC ........ G06Q 10/10; G06Q 10/00; G06Q 10/06; G06Q 30/02; G06Q 10/06316; G06Q 10/087; G06Q 10/063; G06Q 30/00; G06Q 30/018; G06Q 30/0201; G06Q 30/0202; G06Q 30/0206; G06Q 30/0222; G06Q 30/06
USPC ........... 715/212, 214, 220, 221, 235; 710/72
See application file for complete search history.

(56) References Cited

U.S. PATENT DOCUMENTS

| | | |
|---|---|---|
| 6,611,839 B1 | 8/2003 | Nwabueze |
| 7,873,670 B2 | 1/2011 | Statchuk |
| 8,731,972 B1 | 5/2014 | Wolf et al. |
| 8,751,408 B2 | 6/2014 | Linton et al. |
| 8,959,424 B2 * | 2/2015 | Hammoud ............ G06F 17/246 715/212 |
| 2002/0190980 A1 | 12/2002 | Gerritsen et al. |
| 2004/0153822 A1 | 8/2004 | Arcand et al. |
| 2004/0243593 A1 | 12/2004 | Stolte et al. |
| 2004/0243616 A1 * | 12/2004 | Benhase et al. ............. 707/102 |
| 2005/0071776 A1 * | 3/2005 | Mansfield .............. G06Q 30/02 715/805 |

(Continued)

FOREIGN PATENT DOCUMENTS

WO   2006/127859 A2   11/2006

OTHER PUBLICATIONS

International Search Report (from a corresponding foreign applicaiton), EP 13004518.0, mailed Mar. 3, 2014.

(Continued)

*Primary Examiner* — Di Xiao
(74) *Attorney, Agent, or Firm* — Fountainhead Law Group P.C.

(57) ABSTRACT

Described herein are systems and methods for generating user interfaces that include a meta-chart framework for organizing and analyzing multi-dimensional hierarchical data in an efficient and intuitive graphical user interface with which a user can explore and consume prepared analytical elements. The predetermined structure of such user interfaces can include customizable and scalable graphical and/or alphanumeric analytic elements with contextual controls that can guide a user on a preconfigured analytical path, or "drill-down path," to better explore and understand the multidimensional data. Such embodiments provide a turn-key analytical framework from which users can both immediately understand data and learn how to explore the data in greater depth.

20 Claims, 35 Drawing Sheets

(56) References Cited

U.S. PATENT DOCUMENTS

| | | |
|---|---|---|
| 2005/0144528 A1* | 6/2005 | Bucher .............. G06F 9/44505 |
| | | 714/38.14 |
| 2006/0048053 A1 | 3/2006 | Sembower et al. |
| 2007/0055691 A1 | 3/2007 | Statchuk |
| 2007/0266042 A1 | 11/2007 | Hsu et al. |
| 2009/0024660 A1 | 1/2009 | Borgsmidt et al. |
| 2009/0049372 A1* | 2/2009 | Goldberg ..................... 715/227 |
| 2009/0307054 A1 | 12/2009 | D'Imporzano et al. |
| 2010/0205521 A1* | 8/2010 | Folting ................ G06F 17/246 |
| | | 715/227 |
| 2011/0131173 A1 | 6/2011 | Fernandez Ortega |
| 2011/0208690 A1 | 8/2011 | Cushing et al. |
| 2012/0013539 A1* | 1/2012 | Hogan ................ G06F 3/04883 |
| | | 345/173 |
| 2012/0216104 A1 | 8/2012 | Bae |
| 2013/0041923 A1 | 2/2013 | Sappinen |
| 2013/0151431 A1 | 6/2013 | Linton et al. |
| 2014/0082025 A1 | 3/2014 | Armitage |

OTHER PUBLICATIONS

Ladjel Bellatreche, et al.; A Personalization Framework for OLAP Queries; Nov. 4, 2005; Bremen, Germany; 10 pages.

Irene Garrigos, et al.; A Conceptual Modeling Approach for OLAP Personalization; Lucentia Research Group, University of Alicante, Spain; 2009; 14 pages.

Houssem Jerbi, et al.; Management of Context-Aware Preferences in Multidimensional Databases; IRIT; Toulouse, France; 2008; 8 pages.

Extended European Search Report from European Patent Application No. 13004543.8, mailed on Jan. 9, 2014; 8 pages.

\* cited by examiner

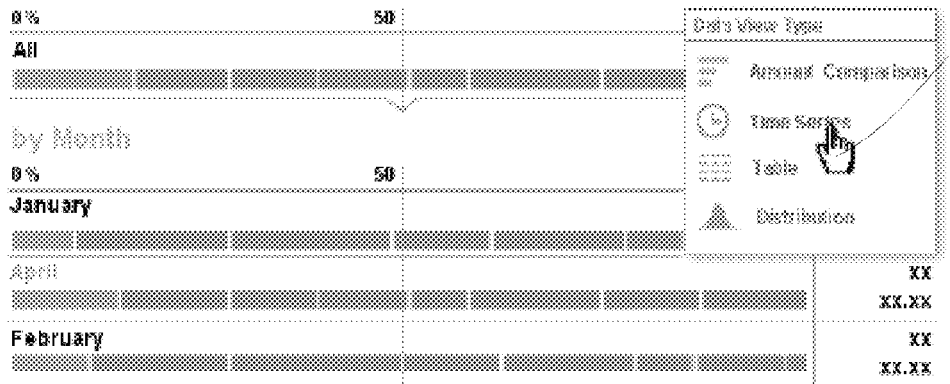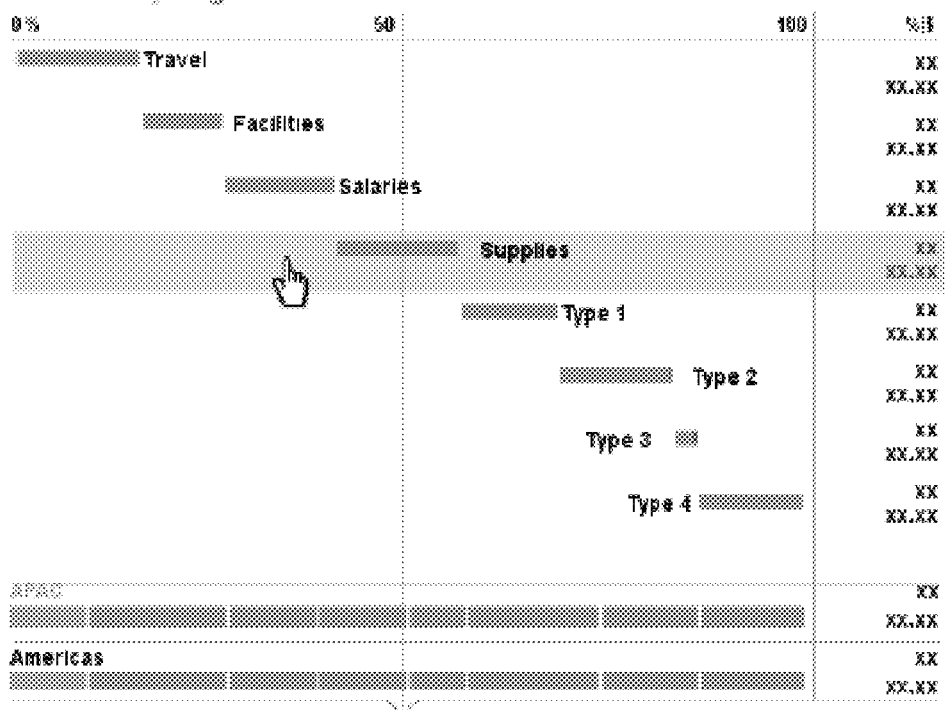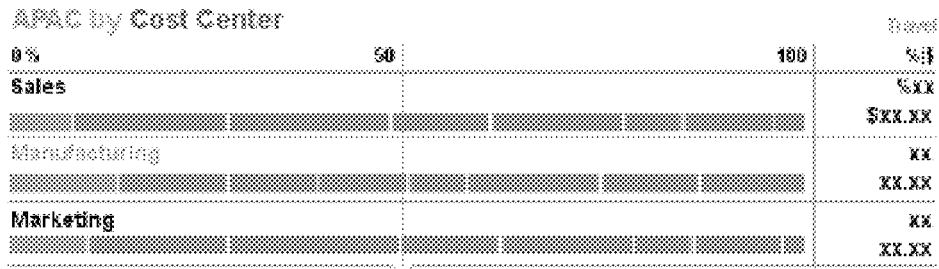
Fig. 28

1000

| Spend by Expense Type Travel | | | | | | | | 1.2 % 〒 |
|---|---|---|---|---|---|---|---|---|
| Jun | Jul | Aug | Sep | Oct | Nov | Apr | Jul | %|$ |
| All | | | | | | | | % xx |
| xx.xx | xx.xx | xx.xx | xx.xx | xx.xx | xx.xx | xx.xx | xx.xx | $xx.xx | by Month

| Jun | Jul | Aug | Sep | Oct | Nov | Apr | Jul | %|$ |
|---|---|---|---|---|---|---|---|---|
| January | | | | | | | | %xx |
| xx.xx | xx.xx | xx.xx | xx.xx | xx.xx | xx.xx | xx.xx | xx.xx | $xx.xx |
| April | | | | | | | | xx |
| xx.xx | xx.xx | xx.xx | xx.xx | xx.xx | xx.xx | xx.xx | xx.xx | xx.xx |
| February | | | | | | | | xx |
| xx.xx | xx.xx | xx.xx | xx.xx | xx.xx | xx.xx | xx.xx | xx.xx | xx.xx |

Facilities by Region

| Jun | Jul | Aug | Sep | Oct | Nov | Apr | Jul | %|$ |
|---|---|---|---|---|---|---|---|---|
| EMEA | | | | | | | | %xx |
| | | | | | | | | $xx.x |
| xx.xx | xx.xx | xx.xx | xx.xx | xx.xx | xx.xx | xx.xx | xx.xx | |
| APAC | | | | | | | | xx |
| xx.xx | xx.xx | xx.xx | xx.xx | xx.xx | xx.xx | xx.xx | xx.xx | xx.xx |
| Americas | | | | | | | | xx |
| xx.xx | xx.xx | xx.xx | xx.xx | xx.xx | xx.xx | xx.xx | xx.xx | xx.xx |

Country

APAC by Cost Center

| Jun | Jul | Aug | Sep | Oct | Nov | Apr | Jul | %|$ |
|---|---|---|---|---|---|---|---|---|
| Sales | | | | | | | | %xx |
| xx.xx | xx.xx | xx.xx | xx.xx | xx.xx | xx.xx | xx.xx | xx.xx | $xx.xx |
| Manufacturing | | | | | | | | xx |
| xx.xx | xx.xx | xx.xx | xx.xx | xx.xx | xx.xx | xx.xx | xx.xx | xx.xx |
| Marketing | | | | | | | | xx |
| xx.xx | xx.xx | xx.xx | xx.xx | xx.xx | xx.xx | xx.xx | xx.xx | xx.xx |

*Fig. 30*

SYSTEM AND METHOD FOR IMPROVED CONSUMPTION MODELS FOR ANALYTICS

CROSS REFERENCE TO RELATED APPLICATIONS

This application is related to application Ser. No. 13/623,241, now U.S. Pat. No. 9,135,314, filed concurrently with the present application, and is incorporated herein by reference in its entirety for all purposes.

BACKGROUND

The present invention relates to techniques for collecting, organizing, and analyzing information from hierarchical multidimensional data sets, and in particular, to systems and methods for improved consumption models for analytics of such data sets.

Unless otherwise indicated herein, the approaches described in this section are not prior art to the claims in this application and are not admitted to be prior art by inclusion in this section.

In business, analysis of past, present, and future performance is a critical task. A multitude of business-data collection, mining, and analysis products exists for the complex task of evaluating a business's performance, planning for future operations, setting targets, and projecting possible scenarios, conditions, and outcomes. Such products usually involve data stores, such as databases, and the combination of hardware and software for accessing, querying, updating, and analyzing various types of business data stored in the data stores.

For example, businesses, and indeed whole industries, exist around providing enterprise resource planning (ERP) applications to businesses of all sizes. Such ERP applications come in a variety of styles and structures, and can include various types and numbers of constituent applications. Each constituent application can be designed to implement a specific type of analysis geared towards assisting one or more aspects of a business organization. As an example, an ERP application can include both the general ledger accounting program as well as a sales and operations planning (S&OP) programs to collect, analyze, plan, and project financial conditions, sales, and operations of a particular business.

While such highly complex and comprehensive applications, such as an ERP application, exist, the manner in which the information contained in such applications is presented to a user varies greatly. To simplify the consumption of such information, various forms of alphanumeric and graphical analytics displayed in a "dashboard" or home screen have been developed. Analytical applications generate complex bar graphs, pie charts, bullet charts, line graphs, histograms, and many other types of graphic and hybrid alphanumeric-graphic visual representations of the data to quickly and concisely convey the analytic information to a user. While each type of visual representation has its associated advantages and strengths for showing various aspects of the data to aid analysis, comparing disparate types of visual representations of the data is often difficult, if not meaningless.

For instance, pie charts are good at depicting portions of a whole, bar graphs are useful for showing summary information for time periods or categories, and line graphs are appropriate for showing trend data, however, comparing a line graph with a pie graph cannot typically yield any useful information. To address the incongruities in the type of information portrayed by the various types of visual analytics and alpha-numeric analytics, many solutions have been developed to provide users with tools to dynamically interact with analytics to further explore, alter, and enhance the way in which the data is displayed. The intended purpose of such tools relies on chance or trial and error that a user will, in real time, determine the best way to display the information in meaningful ways. Clearly such tools are unstructured and do not provide a consistent framework with which to consume visual analytics.

Thus, there is a need for improved systems and methods for consumption models for analytics. The present invention solves these and other problems by providing systems and methods for structured and scalable visual lattice interface with a predetermined analytic or drill down path.

SUMMARY

Embodiments of the present invention are directed toward methods, systems, and computer readable media that include executable code for improving consumption models and practices of analytics. In one embodiment the present invention includes receiving, in a computer system, a multidimensional data set, parsing the multidimensional data set according to a predetermined analysis scheme to generate a subset of the multidimensional data set, generating analysis results in response to the subset and the predetermined analysis scheme, generating a visual representation of the analysis results, and displaying, on a display device of the computer system, the visual representations in a structured lattice interface according to the predetermined analysis scheme.

In some embodiments, the structured lattice interface includes a predetermined number of rows organized in a predetermined number of layers. The predetermined numbers of rows and layers can be based on the predetermined analysis scheme and a user profile associated with a user.

In other embodiments the multidimensional data set can include hierarchical data.

In some embodiments displaying the visual representations and a structured lattice interface can include embedding the visual representations and the structured lattice interface in a monitoring and light analysis user interface.

Various embodiments include receiving user input through a control embedded in the structured lattice interface. Such embodiments can also include updating at least one of the visual representations and the structured lattice interface in response to the user input and the predetermined analysis scheme. Related embodiments also include updating the predetermined analysis scheme according to the user input to generate an updated predetermined analysis scheme and associating the updated predetermined analysis scheme with a user.

The following detailed description and accompanying drawings provide a better understanding of the nature and advantages of the present invention.

BRIEF DESCRIPTION OF THE DRAWINGS

FIG. 12-34 illustrate various elements and functionality according to one embodiment of the present invention.

DETAILED DESCRIPTION

Described herein are techniques for systems and methods for improved consumption models for visual analytics. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments of the present invention are directed toward systems and methods for generating user interfaces that include a meta-chart framework for organizing and analyzing multi-dimensional hierarchical data in an efficient and intuitive graphical user interface with which a user can explore and consume prepared analytical elements. The predetermined structure of such user interfaces can include customizable and scalable graphical and/or alphanumeric analytic elements with contextual controls that can guide a user on a preconfigured analytical path, or "drill-down path," to better explore and understand the multidimensional data. Such embodiments provide a turnkey analytical framework from which users can both immediately understand data and learn how to explore the data in greater depth.

Figure 1:
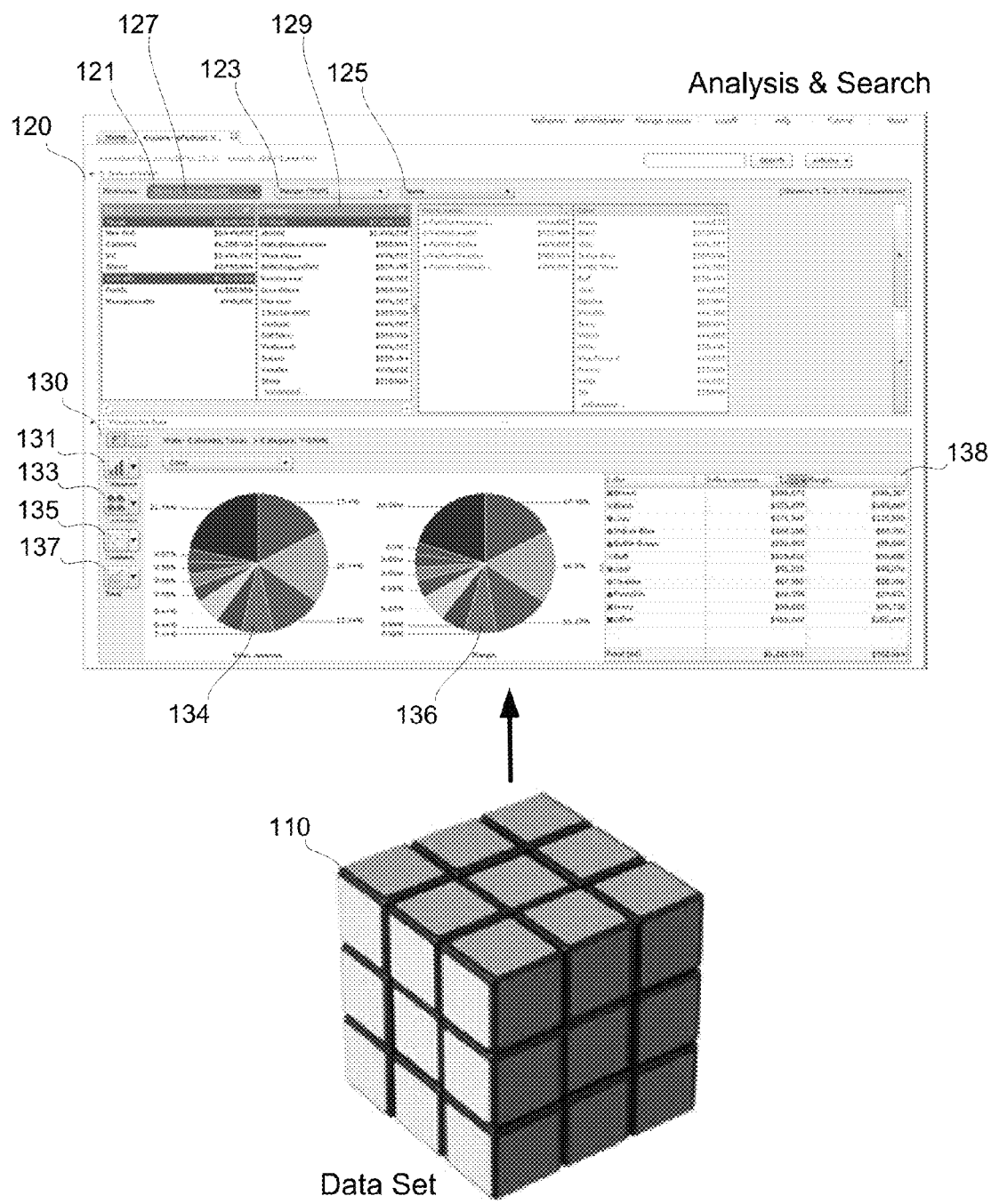
FIG. 1 illustrates a general consumption model for hierarchal multidimensional data.

Multidimensional data can be stored in a variety of file formats. The nature of the multidimensional data allows for exploration and analysis of the data based on any stored category or classification of data within the multidimensional data structure. For instance the data can be classified by region, country, cost center, product, customer, price, cost, etc. Using the classifications of the data within the multidimensional data structure, various aspects of the data can be explored and analyzed using one of many types of applications. FIG. 1 shows a simplified schematic of a general consumption model 100 of multidimensional data set 110. The multidimensional data set 110, commonly referred to as a cube, can be loaded into an analysis and search tool as depicted by the analysis and search tool graphical user interface 120. Using the various controls of the graphical user interface 120, a user can explore various aspects of the data set.

As shown, the user has initiated a tab for exploring an aspect of the multidimensional data set 110. Within this tab, a user can select the measures, or metrics, from pull-down menus 121, 123, and 125. In the scenario shown, sales revenue and margin (SUM) are selected. Just under the measures section, other selectable aspects of the data are shown in the windows 127 and 129 in list form. In the scenario shown in FIG. 1, window 127 shows a selection of states, i.e. Texas and Colorado. Window 129 show a list of product categories. In the example shown, T-shirts are selected. The resulting analysis is then shown in the visualization of the data section 130. The type of chart shown in the visualization of the data can be selected and modified using menus 131, 133, 135, and 137. In the example shown, pie charts 134 and 136 are generated with data legend and additional detail shown in section 138.

Consumption models of multidimensional data, like the one shown in FIG. 1, are incredibly useful for users who know exactly what kind of information to look for and how best to view that information. Accordingly, tools like the one shown in FIG. 1 are best used by sophisticated analysts and technical users for designing dashboards and producing detailed reports. Unfortunately, consumption models that require intricate specifications and controls require significant training and experience in order to produce useful analysis and reports. Embodiments of the present disclosure are directed at generating an intuitive and structured meta-chart framework for hierarchical multidimensional data for everyday monitoring and light analysis by business and non-technical users.

Figure 2:
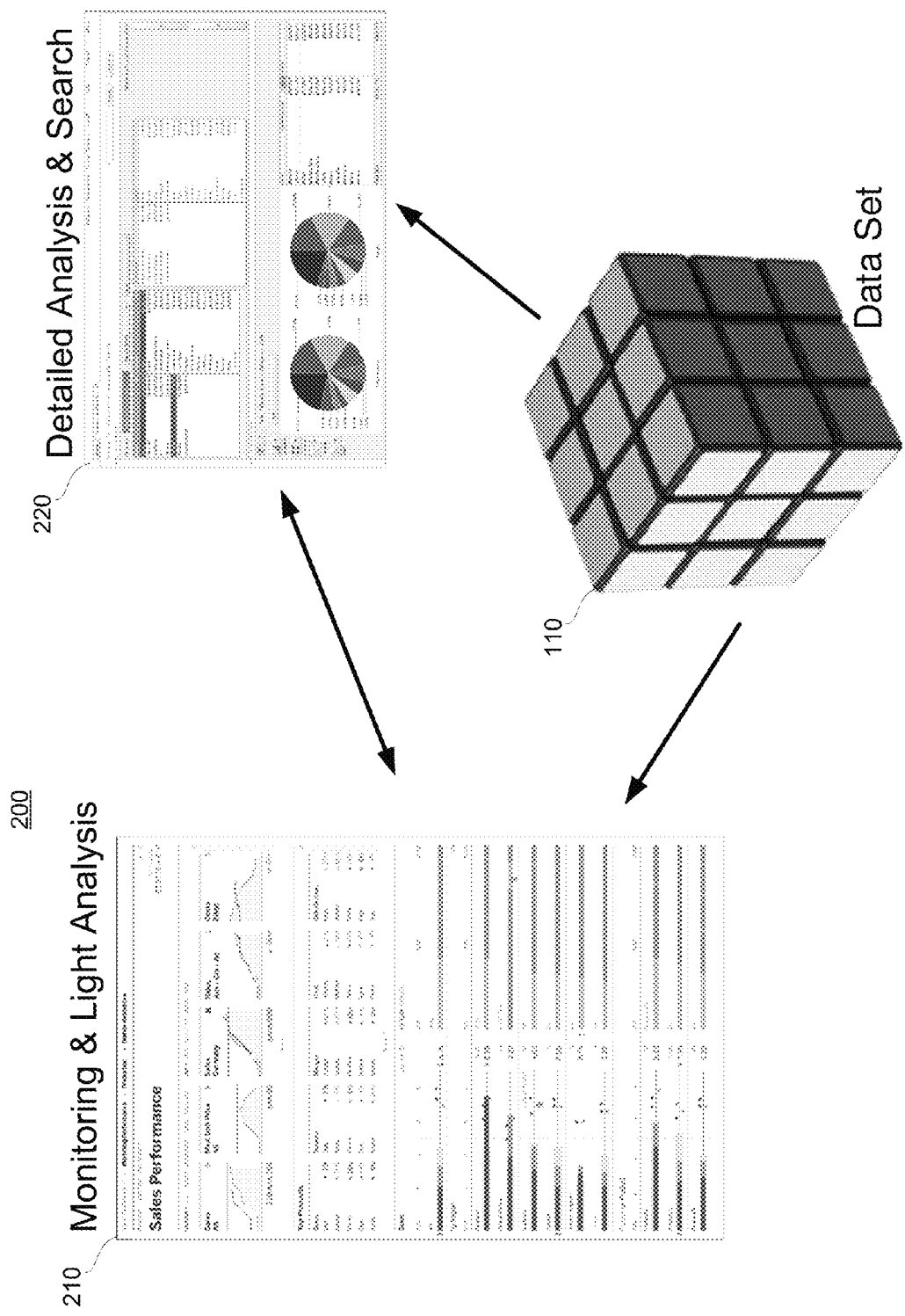
FIG. 2 illustrates an improved general consumption model for hierarchal multidimensional data according to one embodiment of the present invention.

FIG. 2 shows scenario 200 that includes various embodiments of the present invention. In such embodiments, a monitoring and light analysis graphical user interface 210 and a detailed analysis search graphical user interface 220 can both read data from the same multidimensional data set 110. The monitoring and light analysis graphical user interface 210 can be included in various applications or be the product of a standalone application. In such embodiments, the monitoring and light analysis system, application, or application component, can load data from the multidimensional data set 110, perform predefined analysis and calculations, and load the results into the various sections of the monitoring and light analysis graphical user interface 210 as graphical and alphanumeric information. As used herein, the monitoring and light analysis graphical user interface 210 refers to both the structured interface of data on a computer output display, such as a computer monitor, as well as the underlying system, application, or application component used to generate the structured interface. The detailed analysis and search graphical user interface 220 includes analogous features and capabilities to the analysis and search user interface and application discussed in reference to FIG. 1.

In some embodiments, the monitoring and light analysis interface 210 can communicate with and/or invoke the detailed analysis and search interface 220 in response to commands issued by user in the monitoring and light analysis module 210. Based on the information displayed in the monitoring and light analysis interface 210, a user may click on contextual controls to activate a detailed analysis and search interface 220 in order to explore the multidimensional data set 110 in more detail or with a different set of analytical parameters. Accordingly, the detailed analysis and search interface 220 can be manipulated to alter or update the predetermined and structured display of the multidimensional data shown in the monitoring and light analysis interface 210. In this way, the various components and areas of the monitoring and light analysis interface 210 can be customized to a particular user's interests, job functions, or analytical needs in real time without the need for complicated programming, or reliance on skilled information services personnel.

Figure 3:
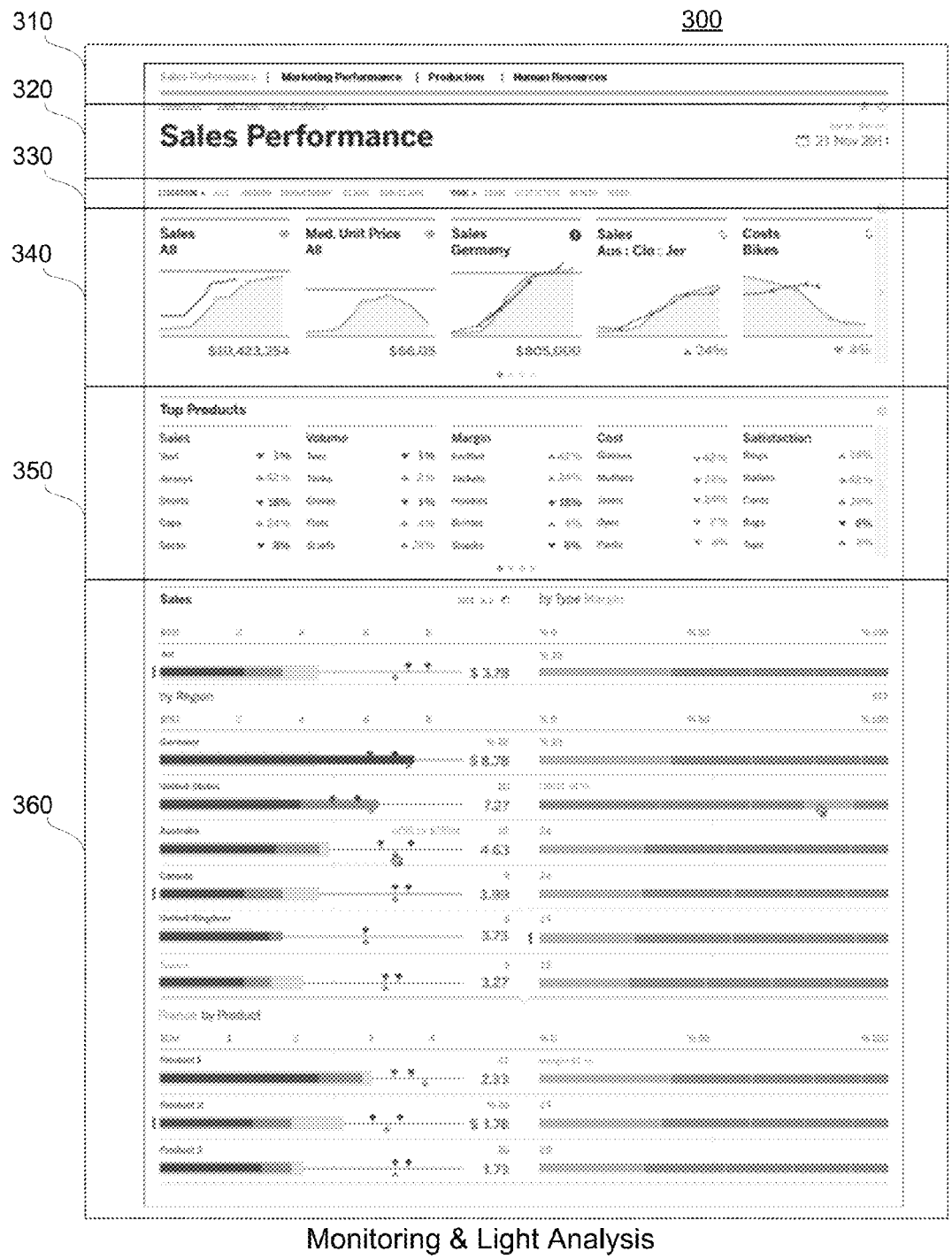
FIG. 3 illustrates a structured user interface for monitoring penlight analysis of hierarchical multidimensional data according to one embodiment of the present invention.

FIG. 3 shows an exemplary depiction of a monitoring and light analysis interface 300 that can be used to implement various aspects of the present invention. As shown, monitoring and light analysis interface 300 can include a navigation section 310, a title section 320, a filter section 330, a Digest section 340, a Gallery section 350, and a Lattice section 360. Various embodiment the present invention are directed towards systems and methods for displaying data in the Lattice section 360.

Figure 4:
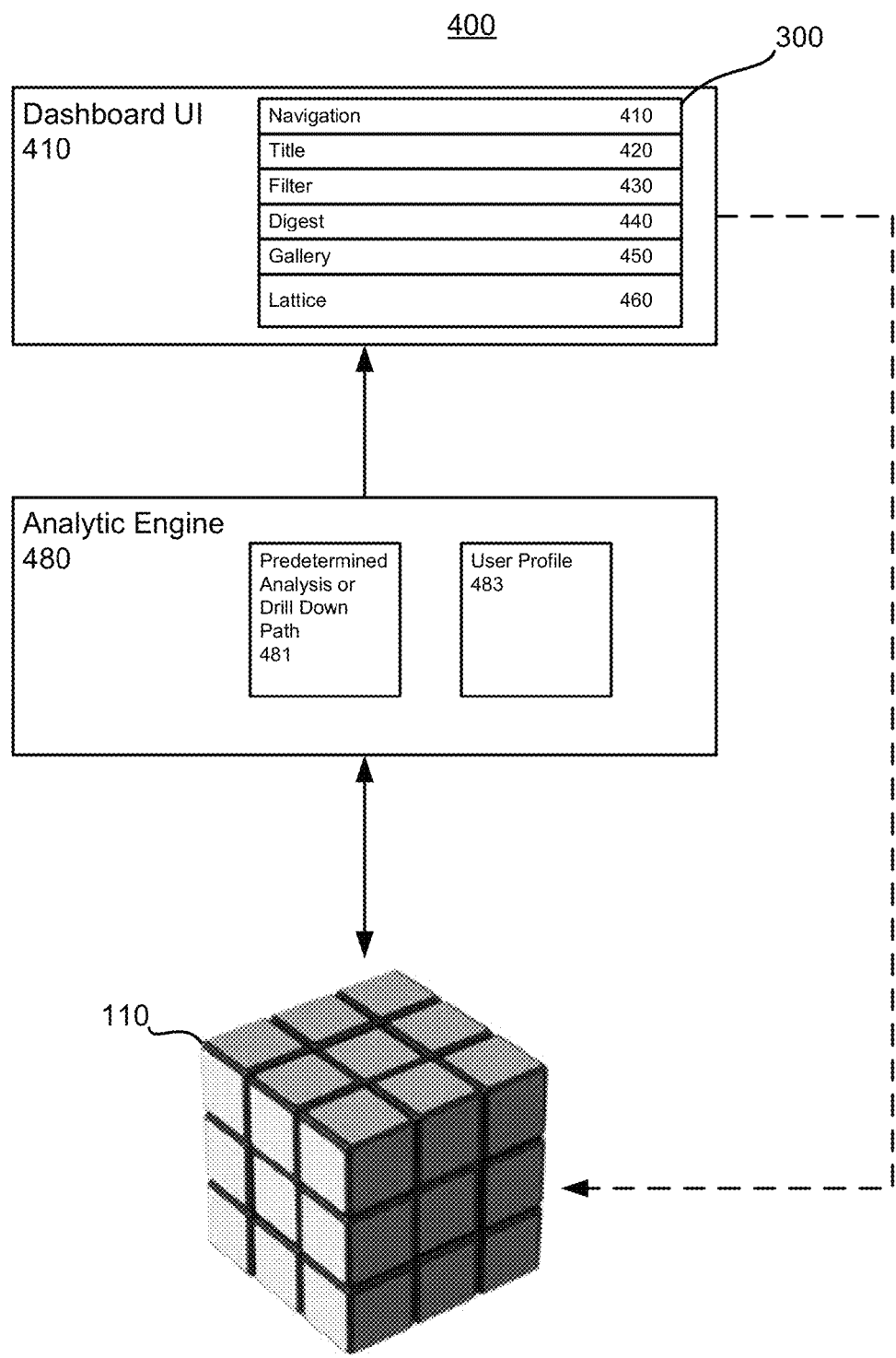
FIG. 4 illustrates a simplified system diagram for providing a structured framework with which to analyze and display hierarchical multidimensional data according to one embodiment of the present invention.

FIG. 4 shows a simplified schematic of a system 400 according to various embodiments of the present invention. Each of the components shown in the FIG. 4 can be implemented by one or more computer systems having processors executing computer readable code. A monitoring and light analysis module 300 can be instantiated, embedded, or included in a dashboard or other user interface 410. As described above in reference to FIG. 3, monitoring and light analysis module 300 can include multiple components or sections. As shown, monitoring and light analysis module 300 can include a navigation section 410, a title section 420, a filter section 430, a Digest section 440, a Gallery section 450, and a Lattice section 460. The dashboard user interface 410 can receive information, data, analytics, and other results from various calculations from the analytic engine 480 and then use those results to generate visual representations of the results. The visual representations of the results can then be loaded in to one or more of the sections of monitoring and light analysis module 300. The monitoring and light analysis module 300 can then generate a user interface to be displayed to a user on a computer output device, such as a computer monitor or a remote or connected display device, such as a tablet computer or PDA.

Analytic engine 480 can include any number of intermediate or enterprise level applications, modules, or systems for viewing, manipulating, storing, or retrieving data from multidimensional data set 110. In some embodiments, the user interface 410 is generated by the analytic engine 480, while in other embodiments, user interface 410 is generated by a separate software application module. The structure of the monitoring and light analysis module 300 can be predetermined and based on a structured framework that can be customized for a particular user, business unit, company, or other purpose. The specifics of the predetermined structure of the monitoring and light analysis module 300, and the constituent components, can depend on default predetermined schemes saved in or accessible to predetermined analysis or drill down path module 481 and/or user profile module 483.

The analytics engine 480 can receive user input to alter the saved versions of the predetermined schemes and user profiles stored in the predetermined analysis or drill down path module 481 and/or user profile module 483. In some embodiments, the predetermined analysis or drill down path module 481 and/or user profile module 483 can be associated with one another to produce specific instances of the dashboard user interface 410 and/or monitoring and light analysis module 300. In related embodiments of the present disclosure, the Lattice section 460 can include a structured framework for displaying the multidimensional hierarchal data from the multidimensional data sets 110 based on default predetermined schemes saved in or accessible to predetermined analysis or drill down path module 481 and/or user profile module 483 in a manner that is both scalable and intuitive.

Figure 5:
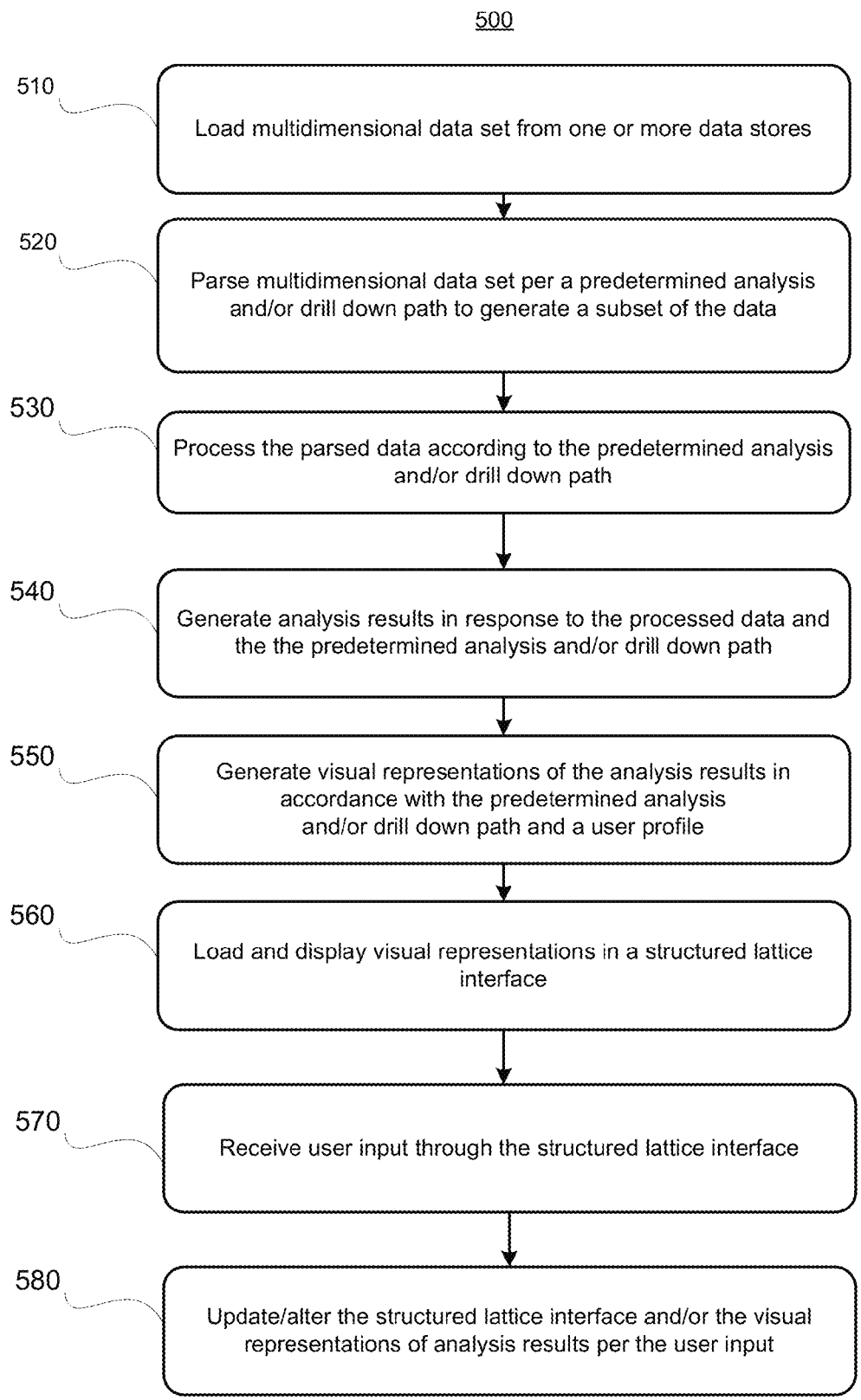
FIG. 5 illustrates a method for analyzing and displaying hierarchical multidimensional data according to one embodiment of the present invention.

FIG. 5 is a flowchart of method 500 according to various embodiments the present disclosure. The method can begin at step 510 in which one or more multidimensional data sets are loaded into a lattice interface module from one or more data stores. The lattice interface module can be included in the dashboard UI 410, the monitoring and light analysis module 300, or the analytic engine 480, described above in reference to FIG. 4. The multidimensional data sets can include business, scientific, or any other categorized or hierarchical multidimensional data. The lattice interface module can a part of a larger application package, such as an ERP system, or it can be part of a standalone data analysis and monitoring system that includes a combination of software and hardware, with connections to other computers in data stores via one or more network or data bus connections. The lattice interface module can include import and translation capabilities or modules for reading in multidimensional data sets stored in various file formats and structures. Such functionality allows the lattice is module to read and process data from a wide variety of data sources.

In step 520, the lattice interface module can parse the multidimensional data according to a predetermined analysis or drill down path. The predetermined analysis or drilled down path can include a set of computer readable instructions stored in the memory, that when executed by processor in a computer system selects the requisite data from the multidimensional data set and loads the parsed data into memory for further manipulation and processing. In step 530, the parsed data from the multidimensional data sets stored in the memory can then be processed according to the predetermined analysis and/or drill down pass. Such processing can include calculations, expressions, and sorts that are designed to achieve the desired predetermined analysis and/or drill down path. The processing can generate various analysis results according to the predetermined analysis and/or drill down path. In step 540, in response to the process parse multidimensional data stored in the memory, the lattice interface module can generate the resulting predetermined analysis of the data. In step 550, the lattice interface module can generate graphic and alphanumeric representations of the generated analysis.

The generated graphic and alphanumeric visual representations of the generated analysis can then be loaded and displayed to a user in a structured lattice interface per the predetermined analysis and/or drill down path, in step 560. While various embodiments the present invention can be used for generating printouts, other embodiments of the present invention can increase functionality through the use of a graphical user interface presented to a user on a computer monitor. Such graphical user interfaces can be manipulated by a user input device, such as keyboard, a mouse, a touchpad, a touchscreen, stylus, etc.

The generated graphic and alphanumeric visual representations and the structured lattice interface can include various types of controls and interactive displays. For example, the graphic and alphanumeric visual representation and the structured lattice interface can include pop-up, dynamic, contextual, pull-down, and static control buttons to augment the generated graphical and alphanumeric visual representations. The specific type of controls shown in the graphic and alphanumeric visual representations can be dependent on the predetermined analysis and more drill down path. In this way, the generated visual display in the structured lattice interface can lead a user down a specific analytic path in order to show the user how to analyze, interpret, or otherwise consume the generated analysis.

In step 570, the lattice interface module, can receive user input through user interaction with the structured lattice user interface. For example, the lattice interface module, can receive menu and control commands from a user operating a mouse to select various controls and options presented in toolbars and control buttons within the structured lattice interface. The lattice interface module can update or alter the structured lattice interface or the displays graphical and alphanumeric representations of the analysis results according to user input and the predetermined analysis and/or drill down path, in step 580.

Figure 6:
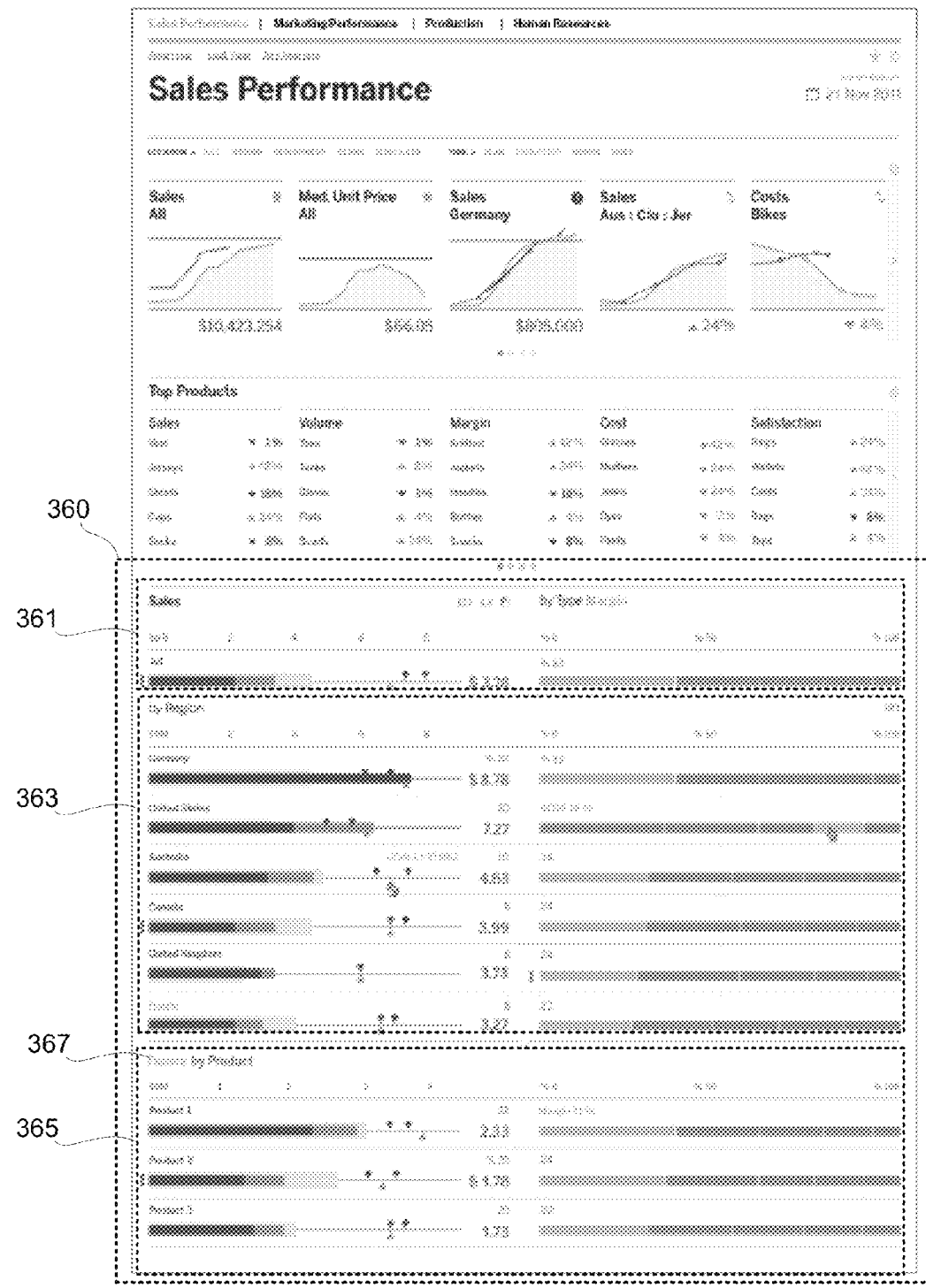
FIG. 6 illustrates a graphical user interface having a structured lattice interface according to one embodiment of the present invention.

FIG. 6 shows a depiction of a specific implementation of Lattice section 360 according to various embodiments of the present invention. As shown, the lattice section 360 can include a number of structured sections. Part of the structure of the particular constituent sections of the Lattice section 360 can include one or more normalized scales for comparing analytical graphics. For example, summary section 361 shows a bullet graph representation of all sales billions of dollars as well a bullet graph representation of margin by type as a percentage. The scale for the summary section 361 can be based on predetermined projections, forecasts, or expectations determine by one or more users. In related embodiments, the scale for the summary section 361 can also be based on the ability for the scale to be enlarged or reduced without distorting the information presented in the graphical analysis. Scales that show percentages can be particularly useful in this regard. In some embodiments, the graphical representation included in the Lattice section 360 can be one-dimensional with multiple layers for showing present, past, and projected performance of various metrics and measures that can be analyzed and displayed. One-dimensional graphics are advantageous because they can easily be scaled at least in one dimension without distorting the information.

Another aspect of the structure of Lattice section 360 can include sections with so-called higher fidelity or more granular view sections 363 and 365 of the data underlying the summary data shown in the summary section 361. The order in which the granular view sections 363 and 365 are shown can be based on a predetermined drill down path into the underlying multidimensional data. The predetermined drill down path can include an order in which data is presented to a user in response to user inputs, such as mouse clicks, in particular areas of the component graphics of the Lattice section 360. For example, when the user clicks on the text 367, i.e. "France", section 365 can be invoked to display more detailed information regarding sales in France by product type. By default, the predetermined structure of additional detailed displays, such as section 365, can be limited to a set number additional lines or lattice sections. For example, as shown, section 365 only includes three lattice rows or lines for products 1, 2, and 3 in France. The predetermined number of lattice rows or lines can be based on the amount of available area in Lattice section 365, or a monitoring and the light analysis interface in which it is located. While summary section 360 is described herein as being a constituent aspect or element of a monitoring and light analysis interface, various embodiments of the present invention are directed towards a standalone Lattice section module. The methods, systems, and techniques described herein with regard to implementing a scalable and intuitive Lattice section 360 can be implemented as a combination of hardware and software to separately read in multidimensional data sets to be displayed to a user or provided for broadcast to multiple users.

For example, a lattice interface according to various embodiments of the present disclosure can be generated by a standalone widget on a personal computing system. Such lattice interface widgets can include stand-alone fully functional executable software application code that can be customized to a particular user or group or users based on their needs and or typical job functions. In yet other embodiments, a lattice generating application can be used to send or broadcast a rolling or scrolling version of a lattice display to one or more computer users or to a television broadcaster to include in a top, side, or bottom scrolling information display to depict various types of financial, business, or news related information to multiple users at the same time.

Figure 7:
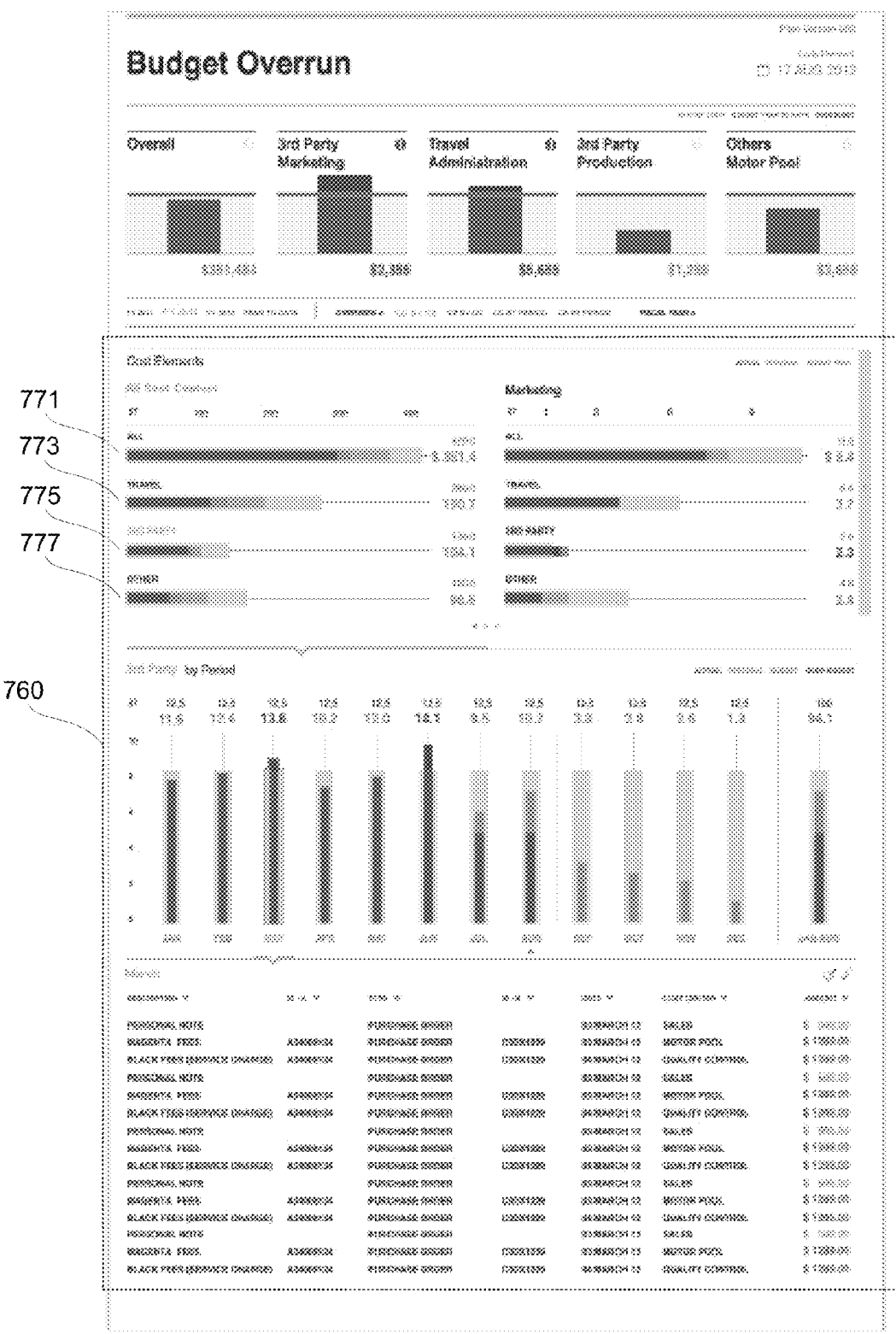
FIG. 7 illustrates a graphical user interface having a structured lattice interface according to one embodiment of the present invention.

FIG. 7 shows another exemplary Lattice section 760 according to various embodiments of the present invention. As shown, Lattice section 760 includes limited or fixed numbers of rows to enable no row divider lines. In such embodiments, the exclusion of divider lines presents a cleaner appearance, as well as providing additional open space between the lattice lines for additional graphical and alphanumeric information. For example, lattice rows 771, 773, 775, and 777 can all be placed based on the predetermined limited and fixed number of rows.

Figure 8:
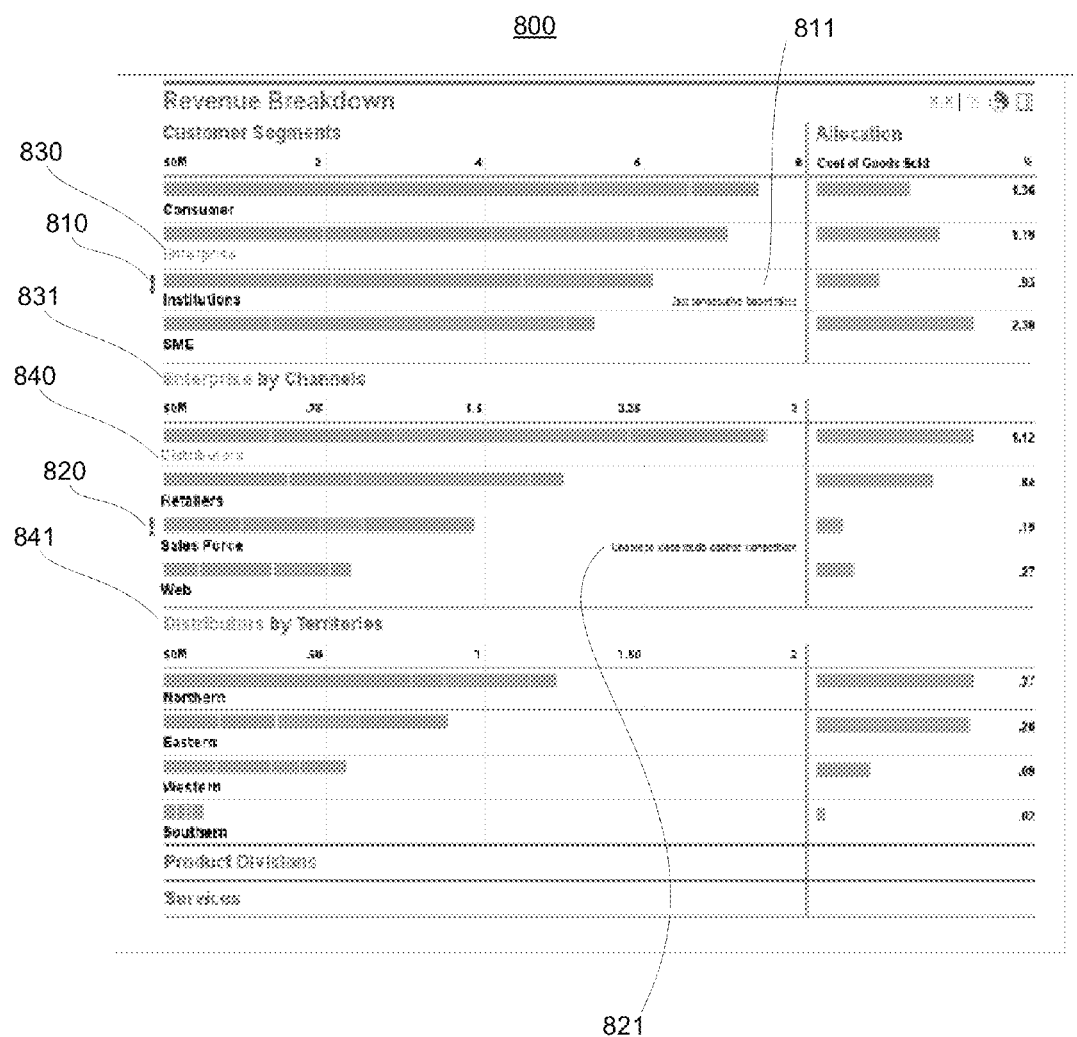
FIG. 8 illustrates a structured lattice interface according to one embodiment of the present invention.

FIG. 8 depicts another exemplary depiction of the structured lattice interface 800 according to various embodiments of the present invention. As shown, structured lattice interface 800 can include additional in-line alerts and notifications such as alerts 810 and 820. In the event that the lattice interface generation module detects or determines a condition in the analysis that is beyond a predetermined value or threshold, or outside a predetermined range, the lattice interface generation module can generate the lattice interface 800 to include the alerts 810 and 820. As shown, alerts 810 and 820 are out of line exclamation points, but one of ordinary skill in the art will realize that any type of warning symbol or icon can be used to give a visual indication of alert condition. Lattice interface 800 also includes in-line additional alphanumeric information 811 and 820. In some embodiments, the additional alphanumeric information 811 and 820 can include information regarding a detected or determined alert condition in the underlying analysis. For example, the in-line additional alphanumeric information can include an explanation from a user as to why that specific analysis is outside expected range. Such explanations can come from journal entries in a general ledger accounting system or can be entered directly from another instance of or similarly instantiated lattice interface. In such embodiments, the in-line additional alphanumeric information can be directly related to the other graphical or other alphanumeric information in the lattice line in which it is displayed.

Lattice interface 800 also depicts a predetermined drill down of the information. Specifically, lattice interface can include operable or clickable controls embedded in text or symbols, such as the "Enterprise" text 830 is shown as part of a net margin analysis in lattice interface 800. In response to the user selecting or clicking control 830, the next section 831 with the "Enterprise by channels" can be generated showing net margin for the enterprise by channels. Section 831 can also include operable or clickable controls embedded in the text or symbols of each of the alphanumeric or graphic analysis indicators. For example, the "Distributor"

text 840 can include a selectable control to generate section 841, which gives the net margin analysis for each distributor by territory. In the specific example shown in FIG. 8, the organization and drill down path that is displayed when anyone of the user operable or clickable embedded controls are selected is predetermined and offers a user an intuitive manner in which to analyze and explore the data contained in a multidimensional data set.

Figure 9:
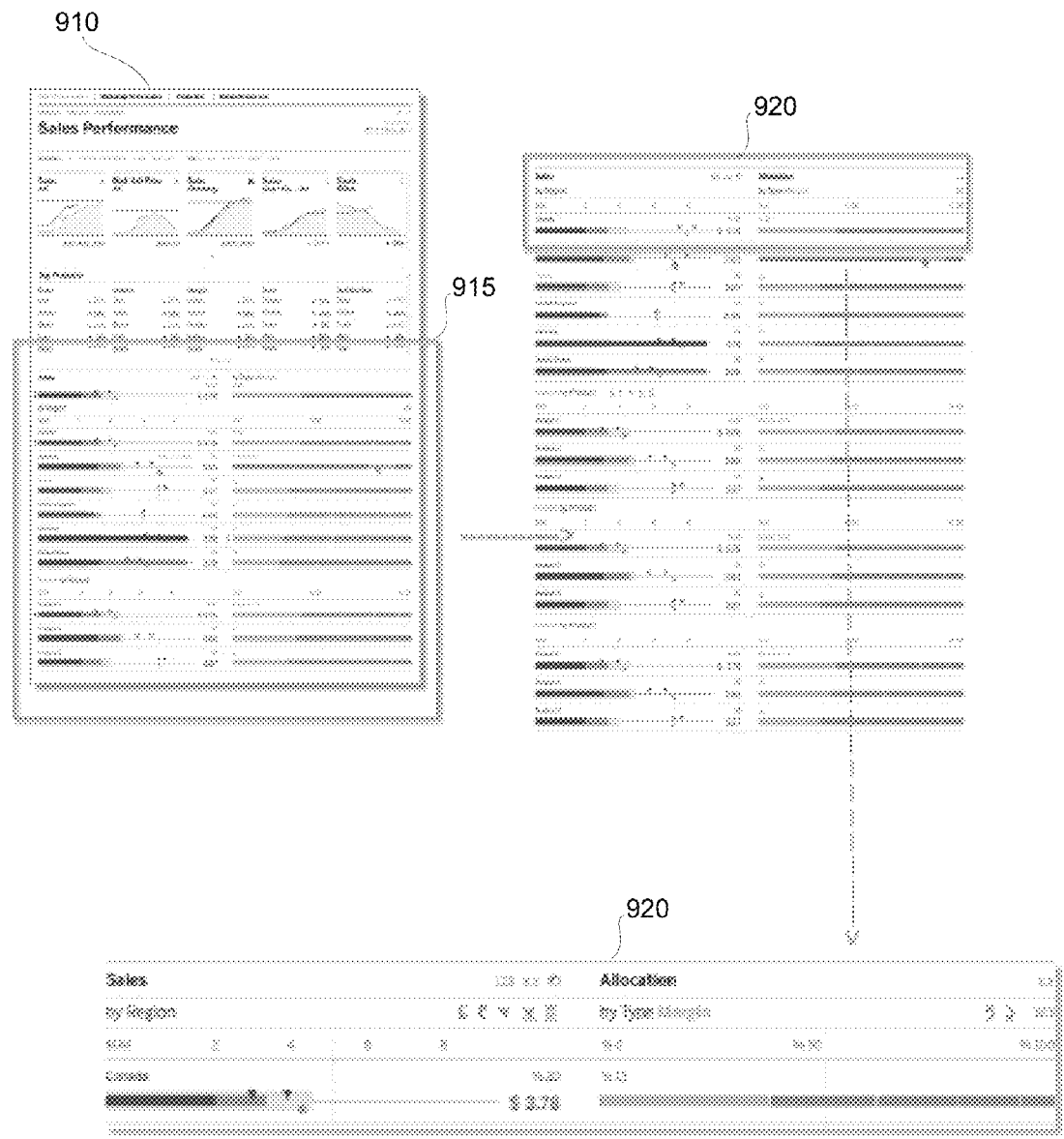
FIG. 9 illustrates the components of a structured lattice interface according to one embodiment of the present invention.

FIG. 9 shows an overview of the anatomy of the lattice interface 915 as it is instantiated in the monitoring and light analysis interface 910. The lattice interface 915 includes a number of layers and rows which are the lattice interface key elements, that can be most customized to individual domains and data sets.

Figure 10:
FIG. 10 illustrates various elements and functionality of a structured lettuce interface according to one embodiment of the present invention.

FIG. 10 shows another exemplary depiction of a lattice interface 1000 and exemplary detailed depictions of its component elements. In some embodiments, the lattice interface 1000 can include specific predetermined elements. For example, lattice interface 1000 include an indication of the measure or metric 1010 displayed and the cross dimension 1011. The lattice interface 1000 can also include a legend or key 1013 with color-coded or shaded indications describing the meaning of any graphical information shown in the lattice interface. In the specific example shown, the shaded values or meanings of the bullet graphs are shown in the key 1013.

Lattice interface 1000 can include a number of columns of graphical and alphanumeric information that can be organized into the number layers and rows. For example, lattice interface 1000 can include layers 1030 and 1040, which are related by a predetermined, structured framework or drill down path indicated by the layer titles 1021, 1023, 1025, and 1027. Each layer can include a number of rows, such as row 1031 and row 1041. The default cross dimension of each subsequent layer can be based on a predetermined drill down path. In some embodiments, the cross dimension is editable so that a user can customize a particular layer of the lattice interface 1000.

In the example shown in FIG. 10, a toolbar or menu 1050 appears when a user selects or hovers over the cross dimension 1023 or another element, such as a specific segments of the bullet graph. Using the toolbar menu 1050, a user can change the metric, measure, or cross dimension or change or shuffle the position of the layer within the stack of layers shown in the lattice interface. With the reorganization or change of specific dimensions of a lattice layer or lattice rows, layers or rows above and below the selected layer row can update automatically in response to any changes. In related embodiments, the lattice interface module can store the preferences of a particular user to remember the order and specific details of deviations or changes to the default predetermined drill down path. As such, the new augmented drill down path can be based on the changes made to the predetermined drill down path.

Figure 11:
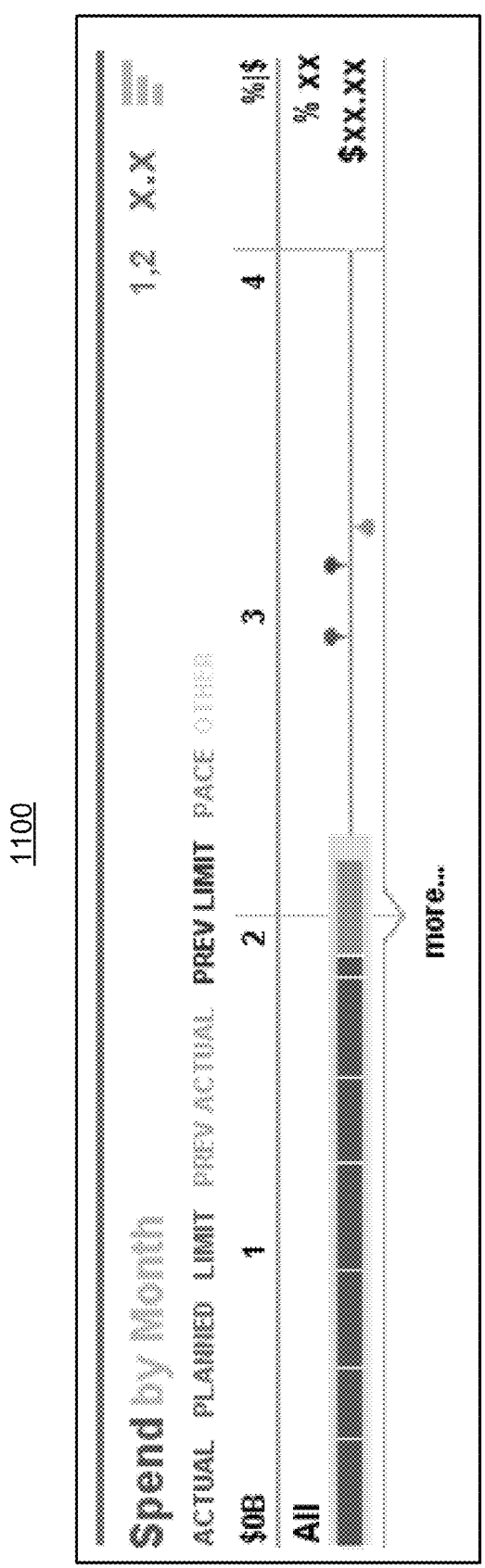
FIG. 11 illustrates a single row of data of a structured lattice interface according to one embodiment of the present invention.

FIG. 11 shows another exemplary depiction of a lattice row 1100 and exemplary detailed depictions of its component elements, according to various embodiments of the present invention. The graphical and alpha-numeric visual indicators shown can all be augmented according to user input, a user profile, and a predetermined drill down path or analysis path.

Figure 12:
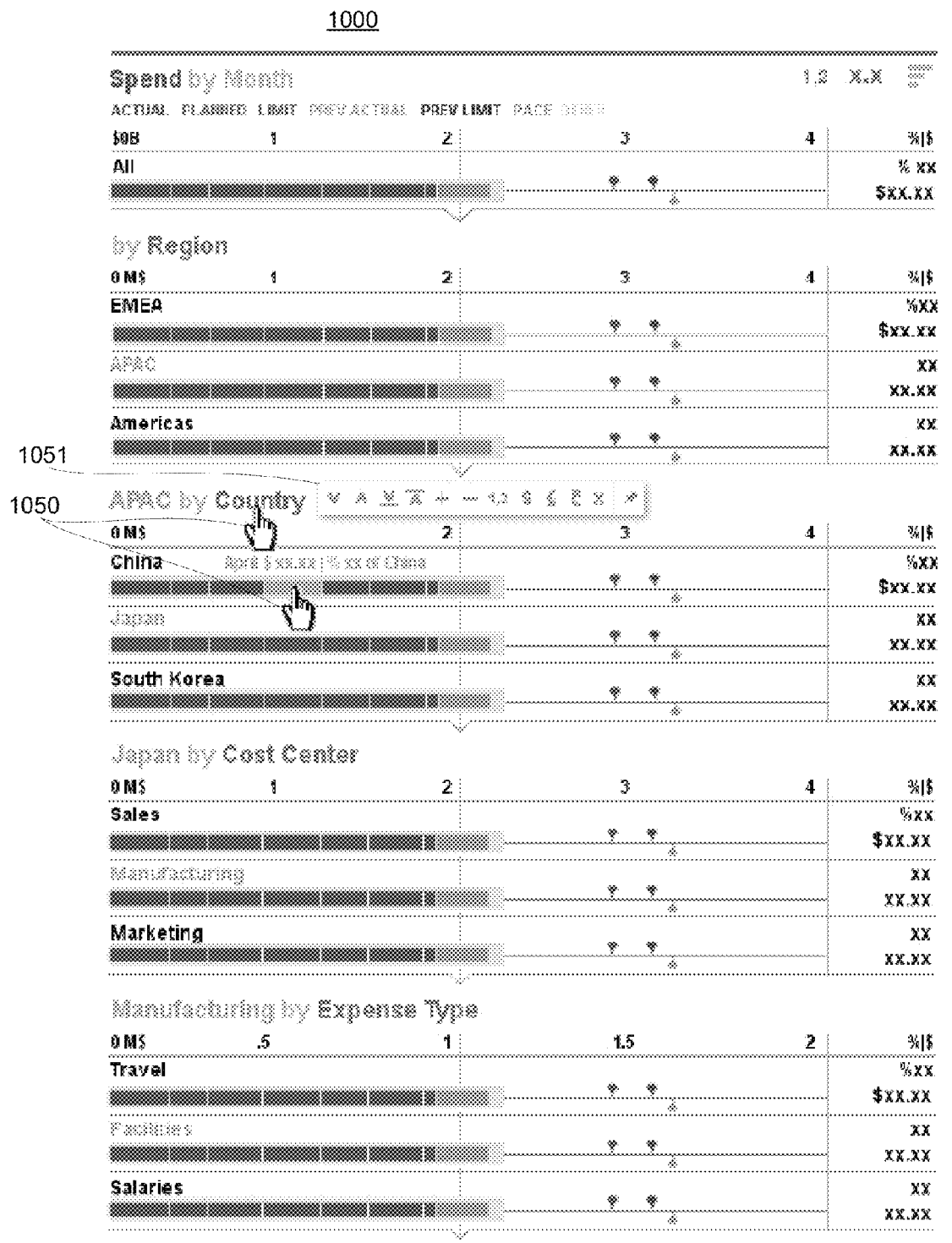

FIGS. 12-34 depict the operation and behavior of the lattice interface 1000 according to various embodiments of the present disclosure. In FIG. 12, user controlled cursor 1050 can hover or scrub over various elements, labels, and controls and in response, the lattice interface module can generate an interactive toolbar 1051. The interactive toolbar 1051 can include various collections of controls. For example, interactive toolbar can include scroll-up by a batch of rows, scroll-down by a batch of rows, scroll to last row in layer, scroll to first row in the layer, expand layer, collapse layer, layer-specific sort toggle, layer-specific actual/percentage display toggle, layer-up shuffle/shift, layer-down shuffle/shift, deselect, and a display lock down, etc.

Figure 13:
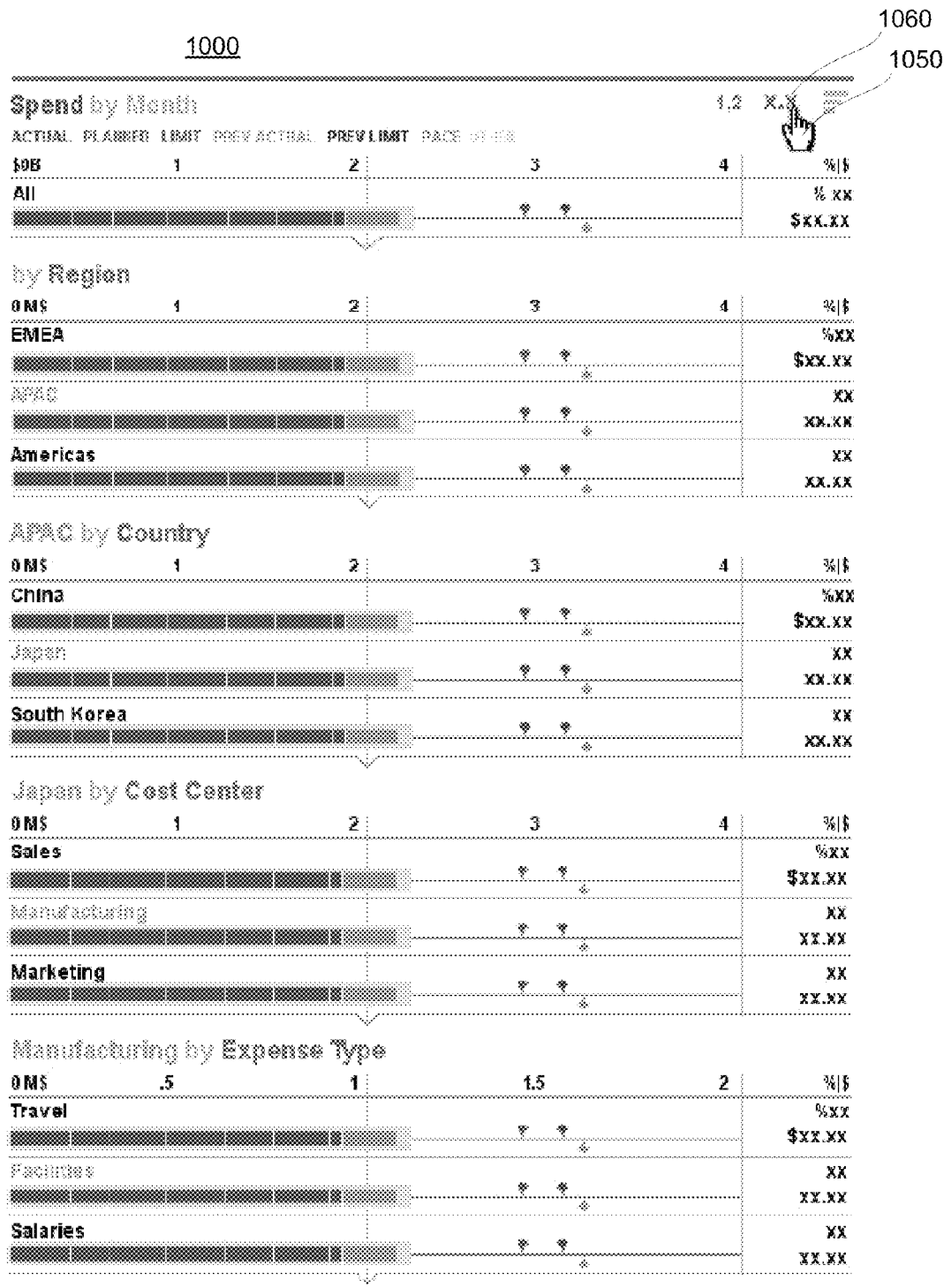

FIG. 13 shows lattice interface 1000 with user controlled cursor 1050 hovering over the a actual/percent toggle 1060. The global actual/percent toggle 1060, when activated, can change the display settings, such that the scales and numeric values displayed in the rows and layers of the lattice interface 1000 switch between actual values/figures and percentages. Global actual/percent toggle 1060 can act on all or some of the layers and rows in the stack.

Figure 14:
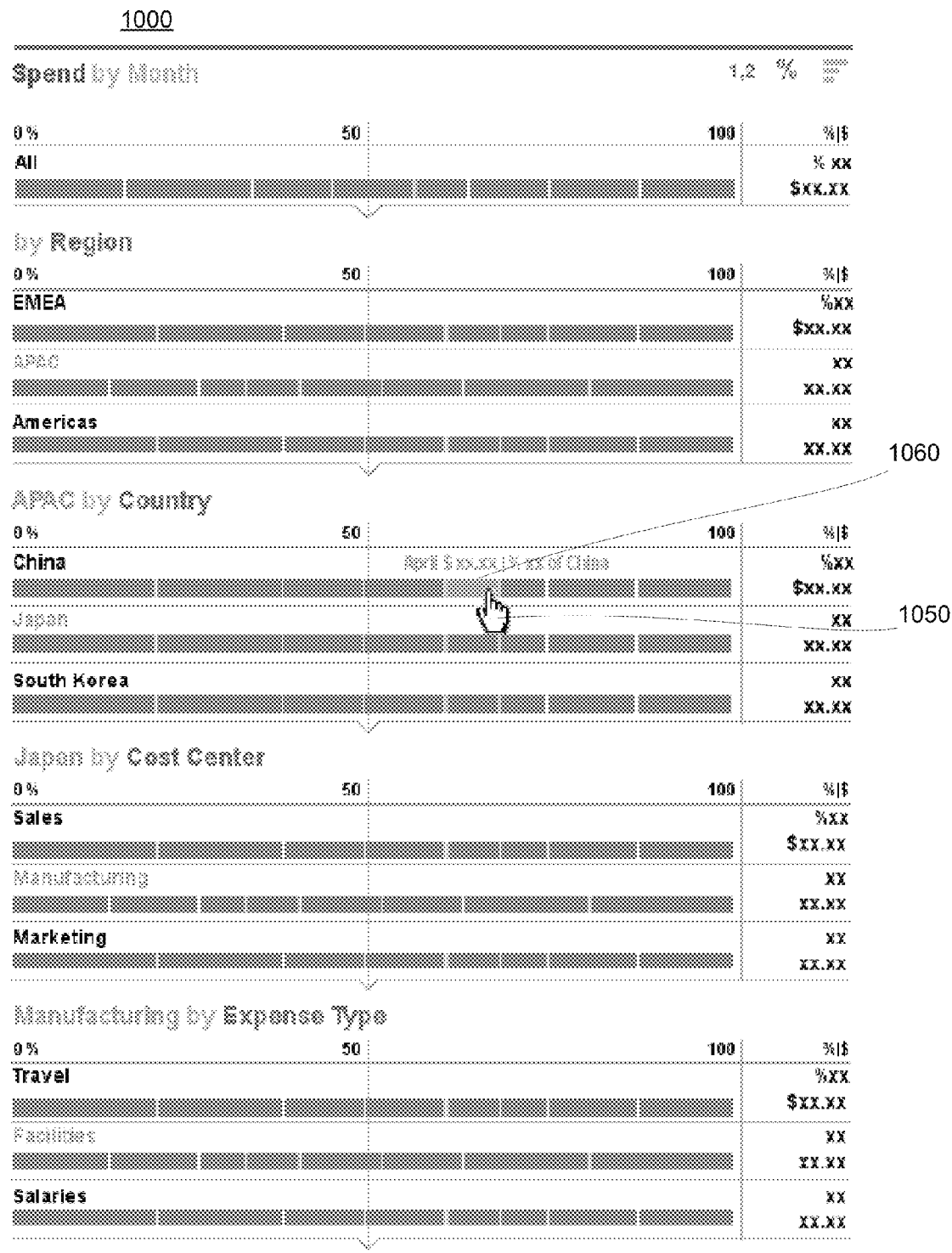

FIG. 14 shows lattice interface 1000 with user controlled cursor 1050, hovering over and/or selecting section 1060 of a specific bullets graph. In this example, when the user controlled cursor 1050 hovers over section 1060, pop-up information shown for that specific graph can be generated and displayed by the lattice interface module. In other embodiments, the user controlled cursor 1050 can be used to select, i.e. click or otherwise operate embedded controls of the specific graphic 1060, the lattice interface module can generate a new set of lattice layers to display detailed information regarding the specific selected graphical element. For example, as shown, the spending values by month for the Asian Pacific Region (APAC) by country are displayed. The particular month of April is selected and the lattice interface module can generate a new set of lattice layers as depicted in FIG. 15.

Figure 15:
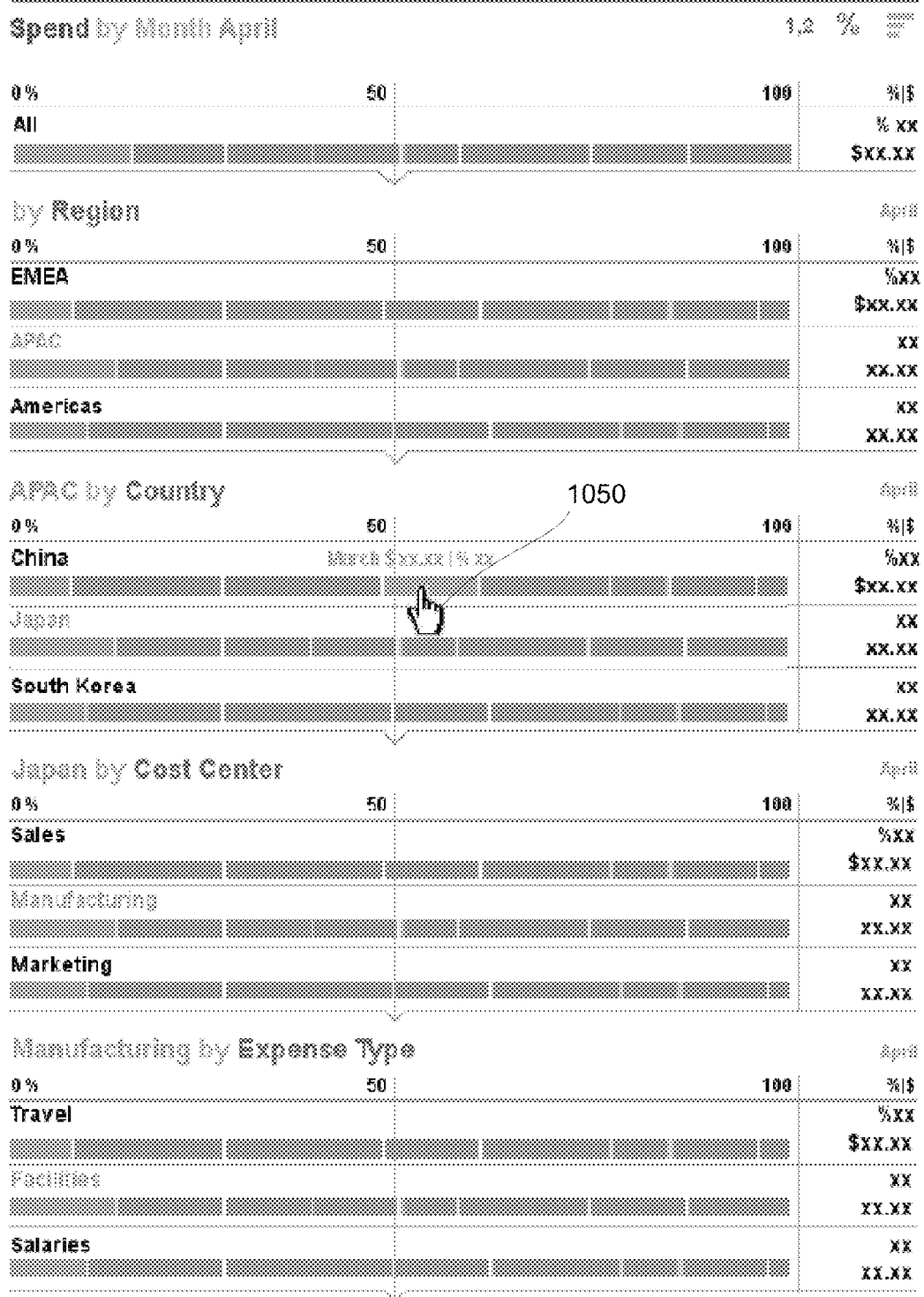

FIG. 15 lattice interface 1000 is shown as being reorganized for the month of April. The new shaded areas in each row depict the information as a percentage of the total spend values for the month of April according to each measure for each lattice layer. In this example, the spend by month of April is first broken down into a summary view at the top. The lattice interface 1000 then breaks down the data further into specific layers, wherein each layer is related to other layers by a specific aspect, measure, or category in another layer. For example, the breakdown by region includes listings of a predetermined number of regions in predetermined order. In the specific example shown in FIG. 15, APAC is selected. In response to the selection of APAC, the lattice interface module can generate another predetermined layer entitled APAC by country. A specific country can then be selected, in this case, Japan. The lattice interface module can then generate an additional predetermined layer of a predetermined number of rows to display information for Japan by cost center. Cost center manufacturing is selected, and in response thereto, the lattice interface module can generate an additional predetermined layer that includes a predetermined number of rows for manufacturing by expense type. This process can continue to allow the user to drill down further into the data along the predetermined drill down path.

Figure 16:
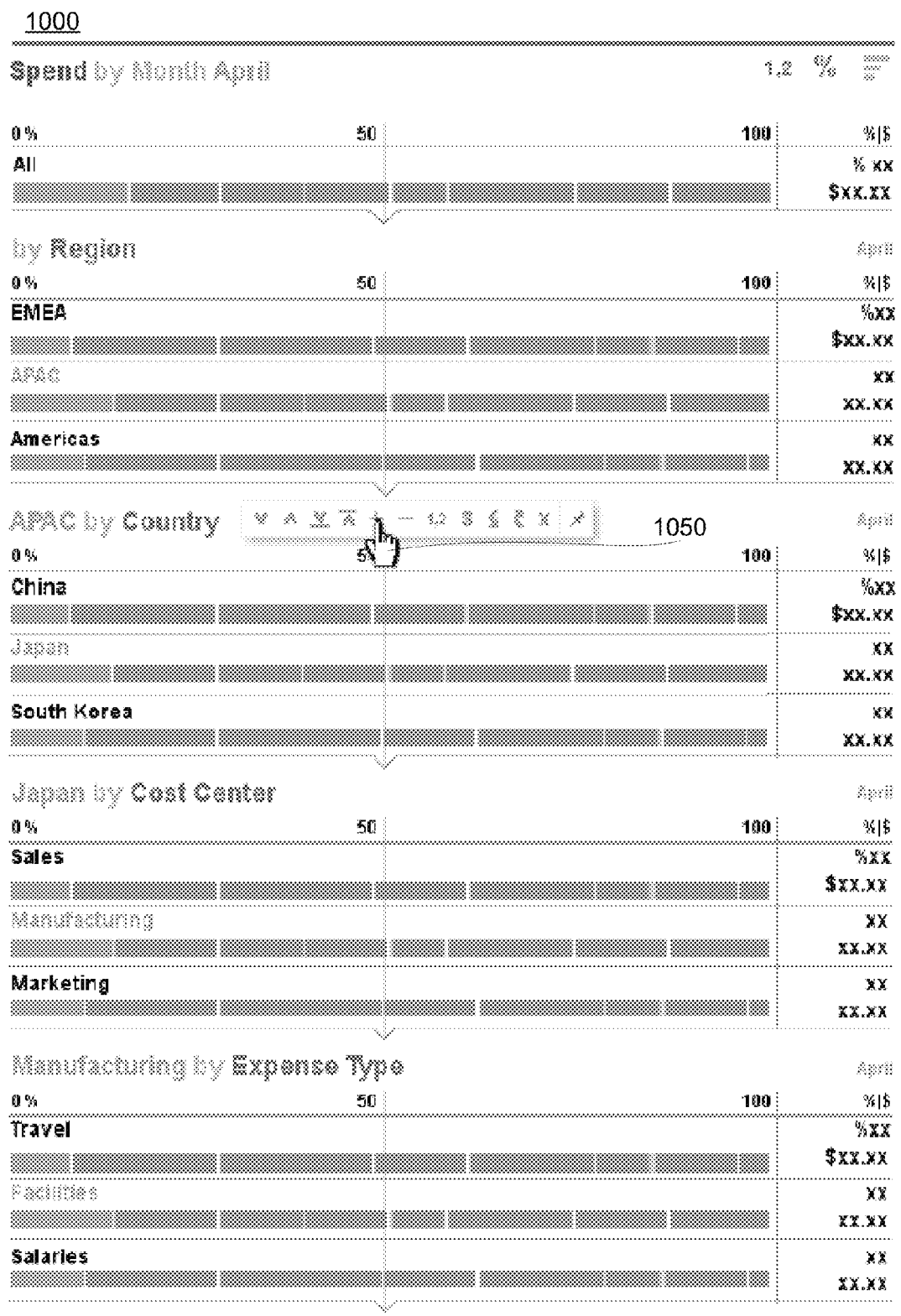
Figure 17:
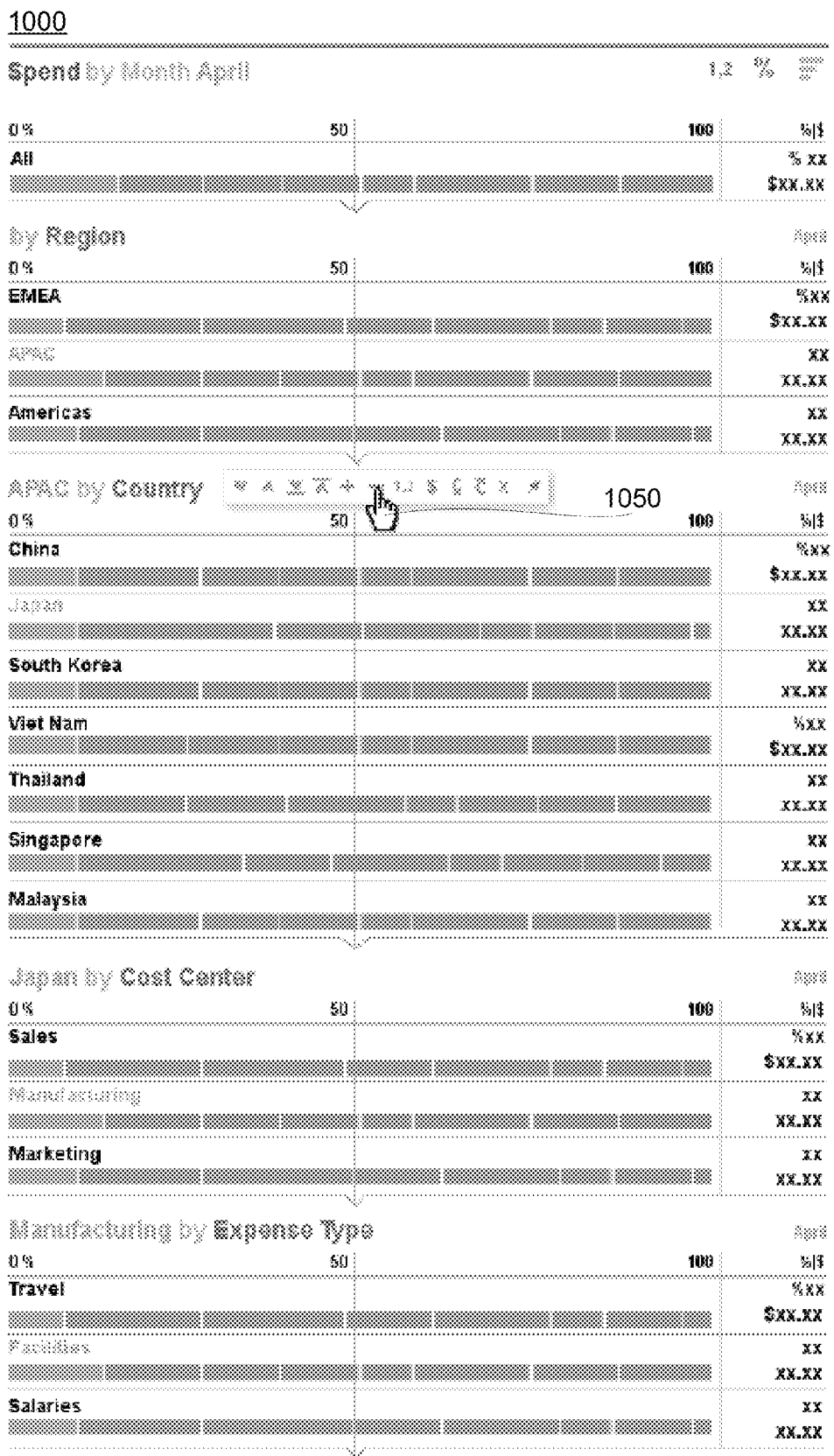

FIGS. 16 and 17 illustrate how user control cursor 1050 can be used to invoke the toolbar to expand a specific layer to include more lattice rows than the default number of rows. In the specific example, the layer that includes APAC by country, can be expanded from the default three lattice rows, as shown in FIG. 16, to more if not all of the other available lattice rows for that particular layer. For example, as shown in FIG. 17, APAC by country can include lattice lines for China, Japan, South Korea, Vietnam, Thailand, Singapore, and Malaysia.

Figure 18:
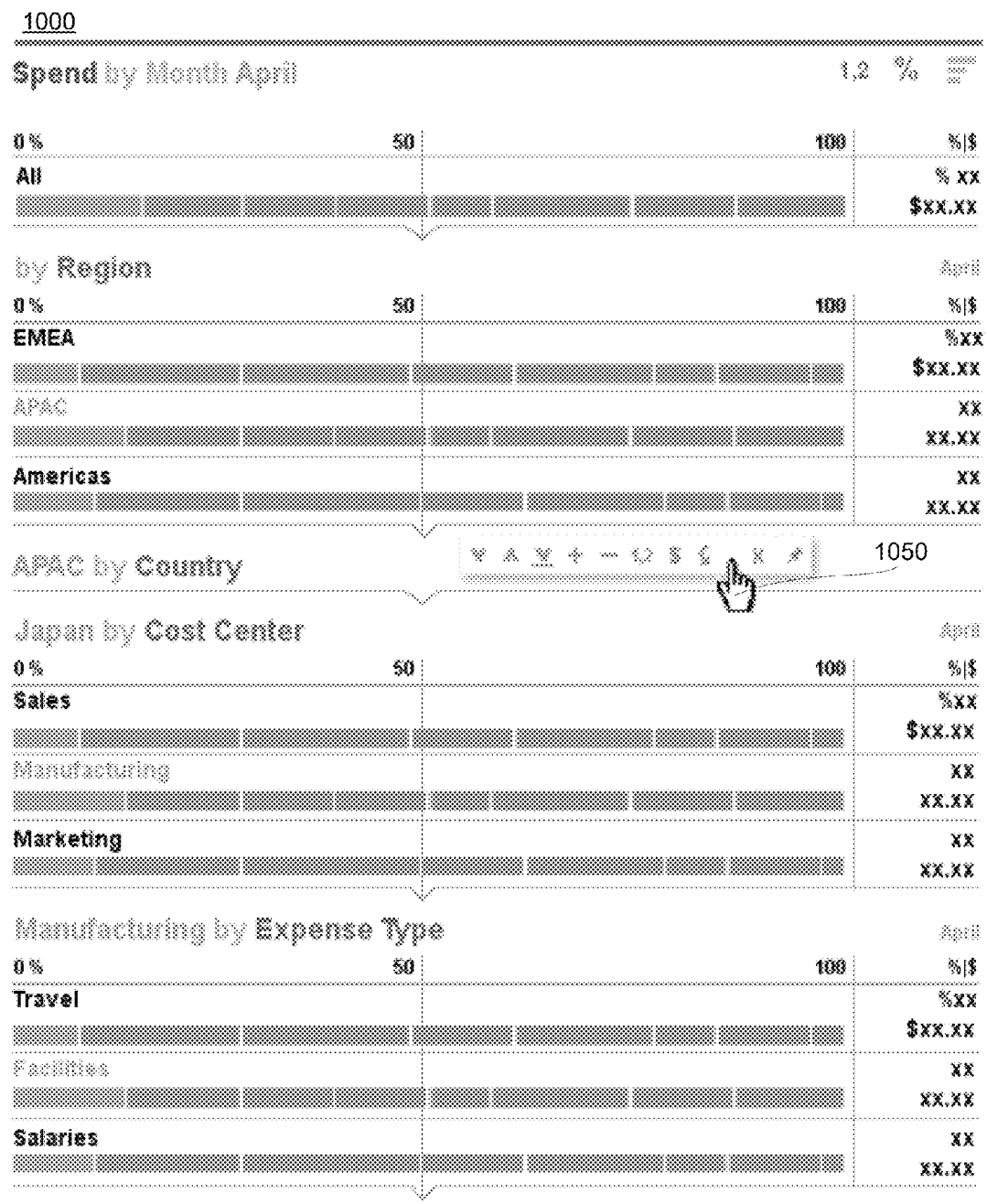

FIG. 18 depicts how the user controlled cursor 1050 can be used to operate the toolbar for the a specific layer to collapse the lattice rows to hide them from view. For example, the toolbar for the APAC by country layer can be invoked by scrolling over the APAC by country title text, or by right clicking the mouse. The collapse button of the toolbar can then be operated to collapse the lattice rows as shown.

Figure 19:
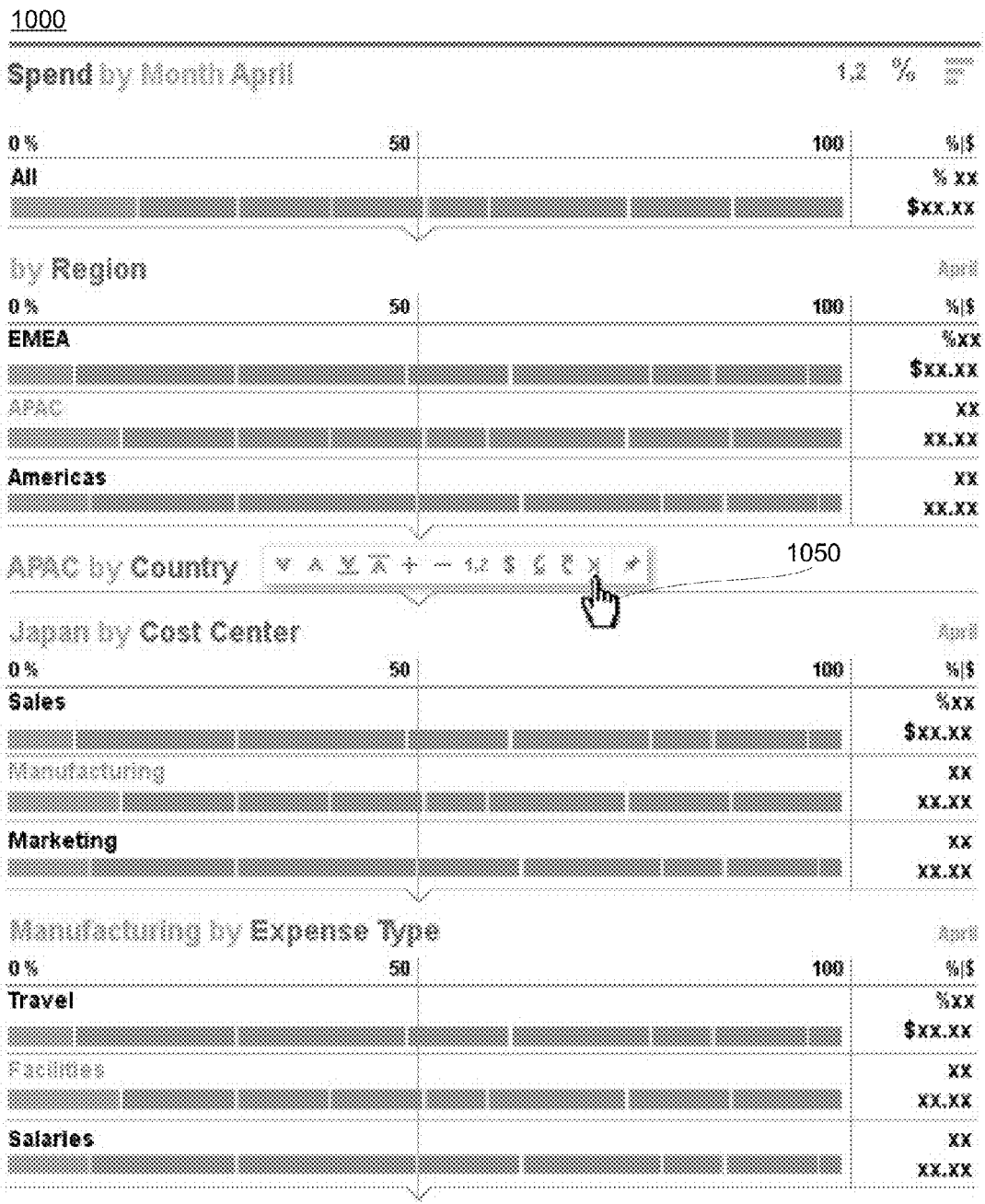
Figure 20:
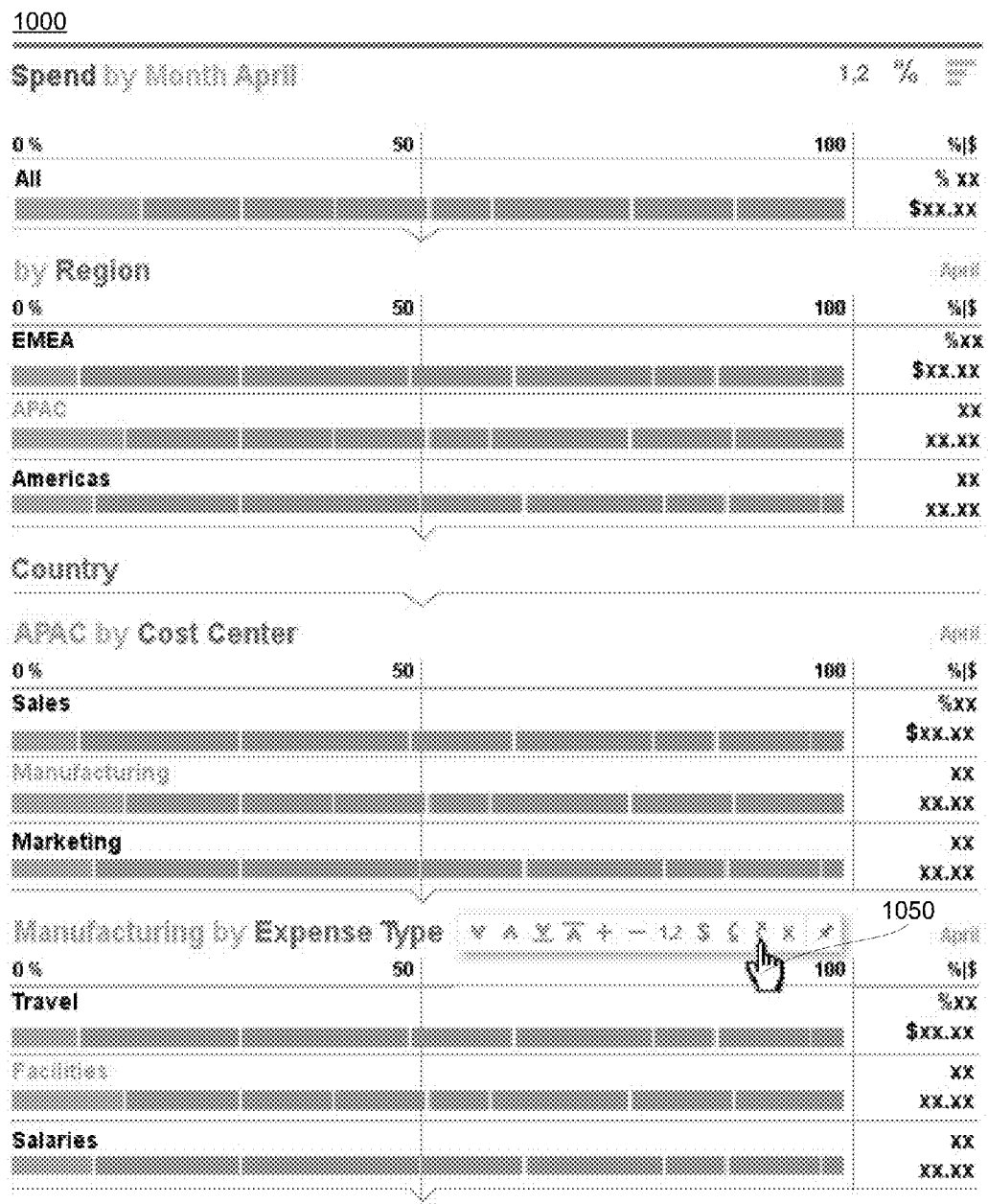
Figure 21:
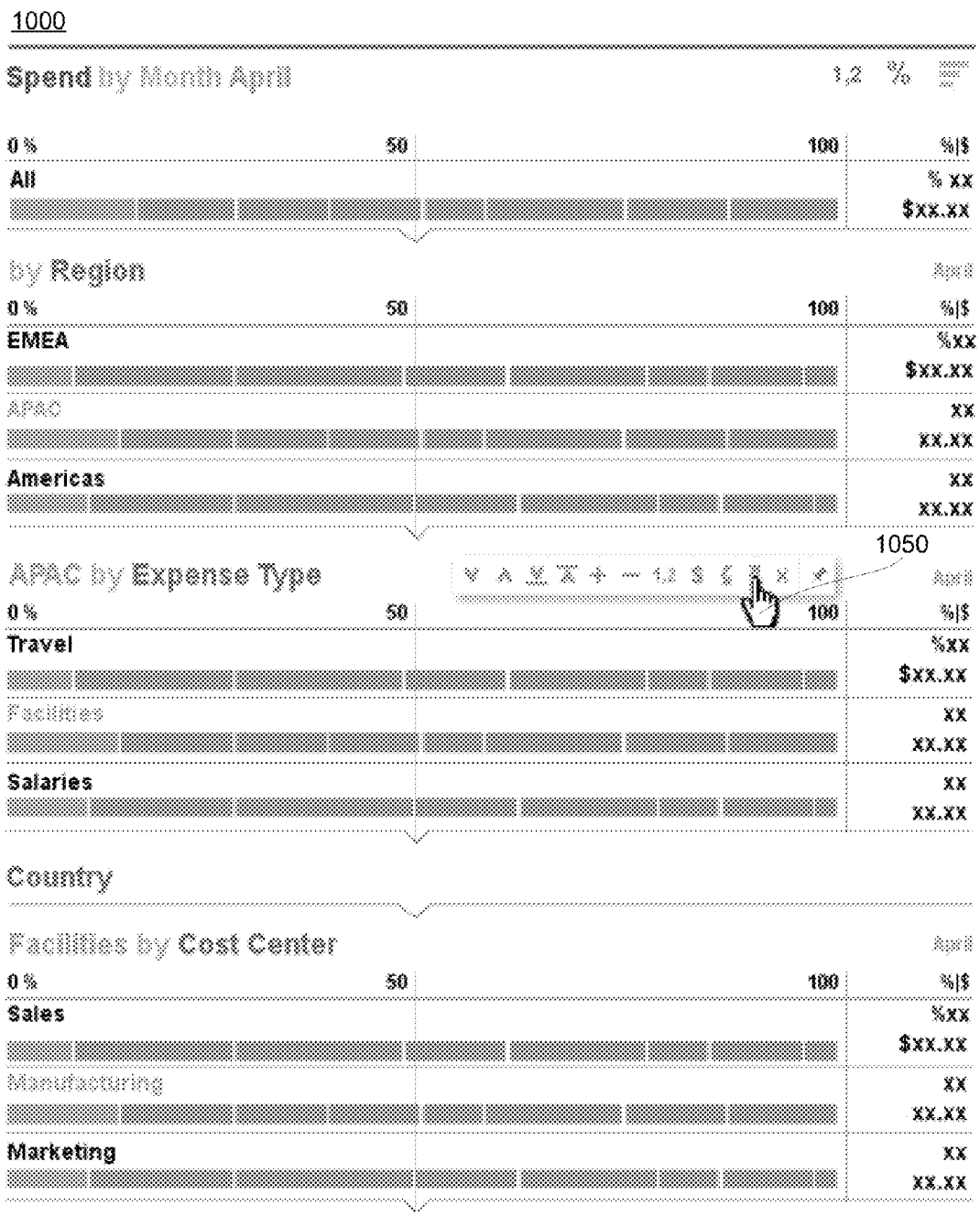
Figure 22:
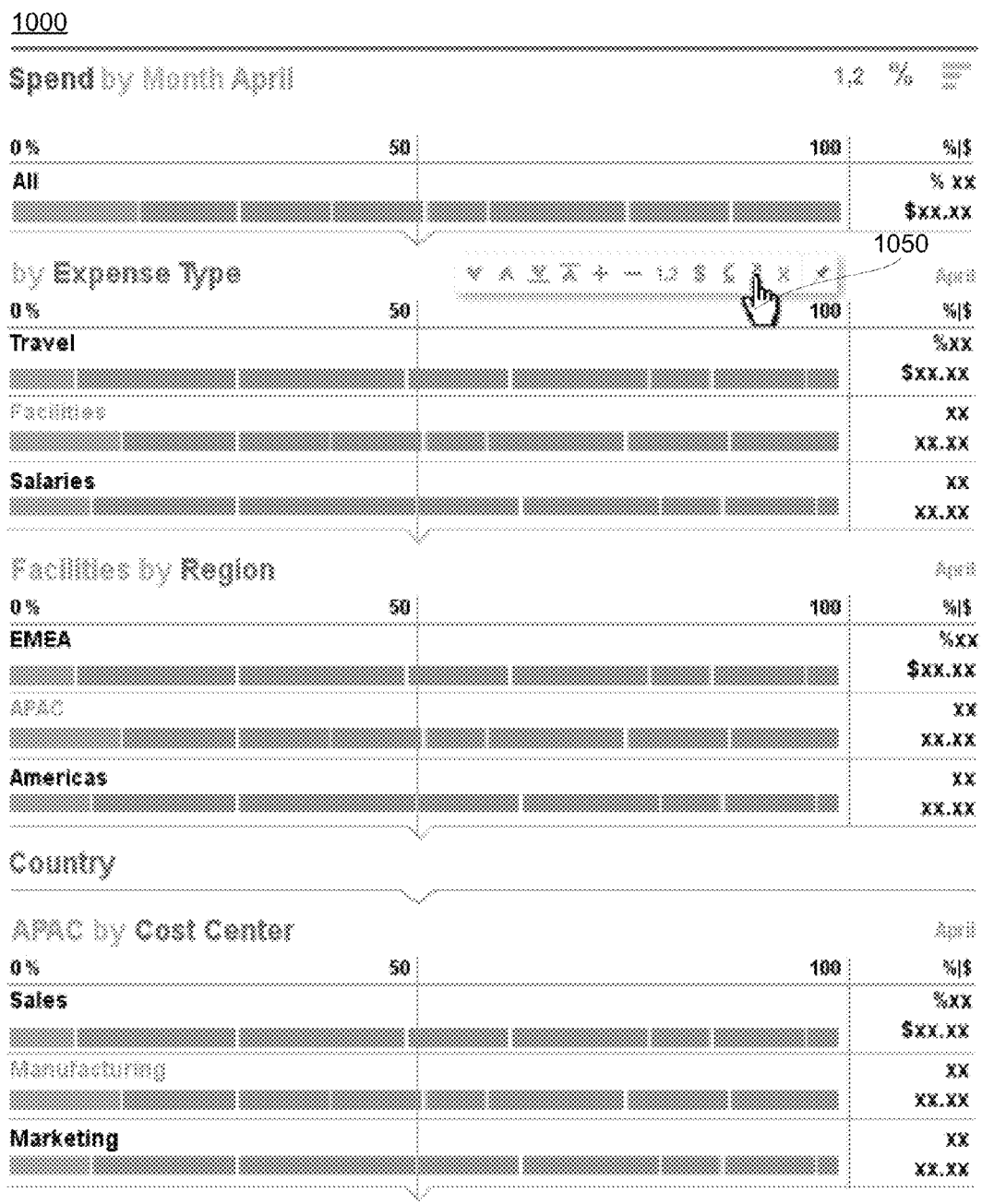
Figure 23:
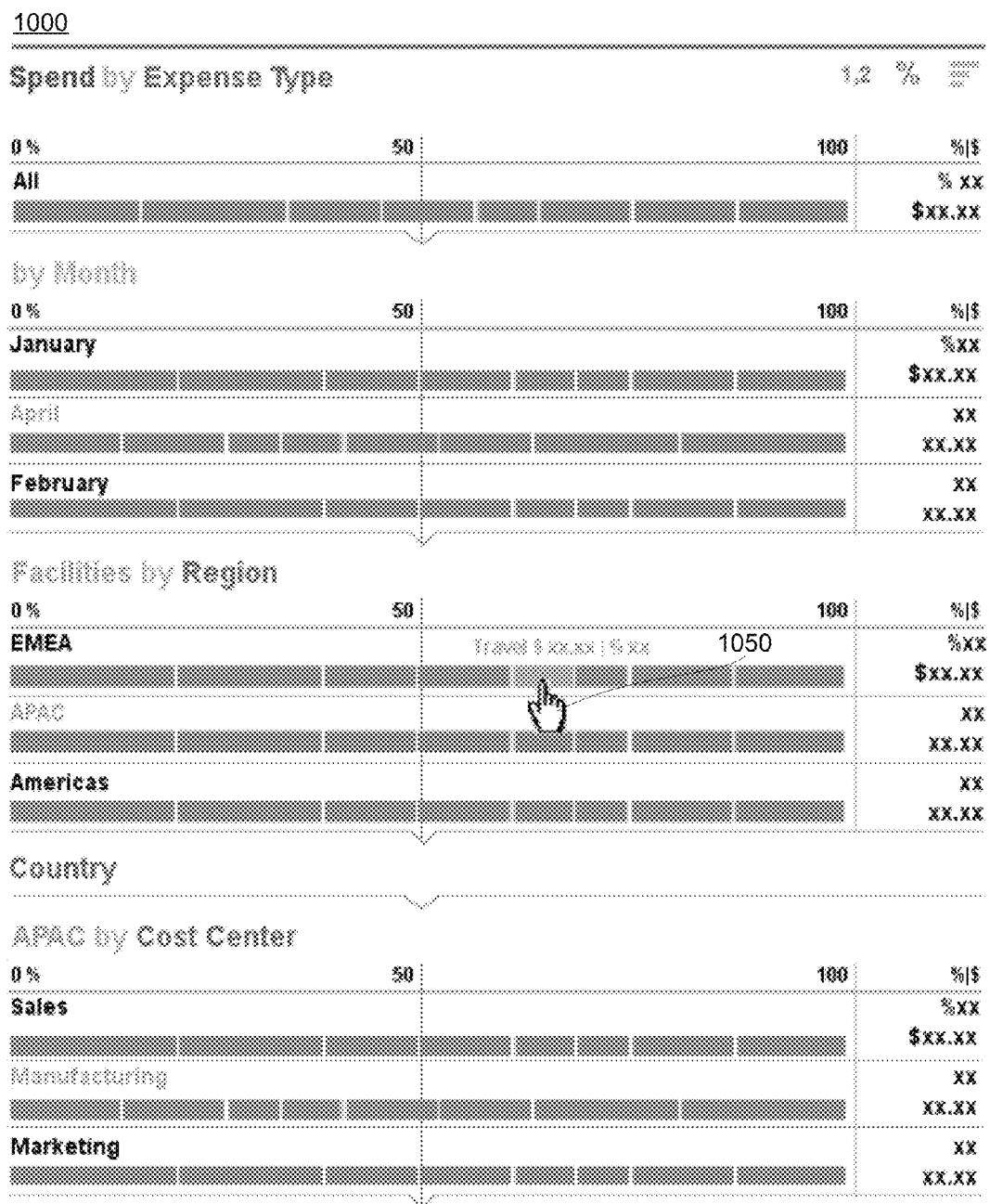

FIG. 19 shows how the user controlled cursor 1050 can be used to invoke the toolbar and operate the delete button to remove a particular layer from lattice interface 1000. In the example shown in FIG. 19, the user controlled cursor 1050 is used to select the deselect/delete button of the toolbar invoked from the APAC by country layer. FIG. 20 shows lattice interface 1000 with the APAC by country layer removed. FIG. 20 also shows user controlled cursor 1050 activating the toolbar for the manufacturing by expense layer to activate the shuffle/shift up control button in the toolbar. FIG. 21 shows the reorganization of the layers of lattice interface 1000 after the action shown in FIG. 20 to move the by expense layer higher up in the stack. In the example shown in FIG. 21, third layer down in the stack is now a APAC by expense type layer. FIG. 22 shows how the by expense type layer can be further moved up the stack of lattice layers by repeating the selection of the toolbar for the by expense type cross dimension to invoke the dynamic toolbar and selecting the shuffle/shift up button using the user controlled cursor 1050. FIG. 22 also shows that the layer by expense type can be further moved up in the stack of lattice layers such that the resulting lattice interface 1000 is changed from a spend by month of April type stack to a spend by expense type stack, as shown in FIG. 23. By shuffling/shifting the layers up to the top, the top layer dimension (expense type) can be, the cross dimension, and the previous cross dimension (month) becomes the top layer. The new, cross dimension then determines how the strip charts in each one of the lattice rows are sliced. In the example shown, the slices of the strip charts are now divided by month instead of expense type.

FIG. 23, also illustrates how the user control cursor can cover or scroll over particular section of one of the bullets graphs to invoke a pop-up or dynamic information/analysis indicator in the newly formed version of lattice interface 1000.

Figure 24:
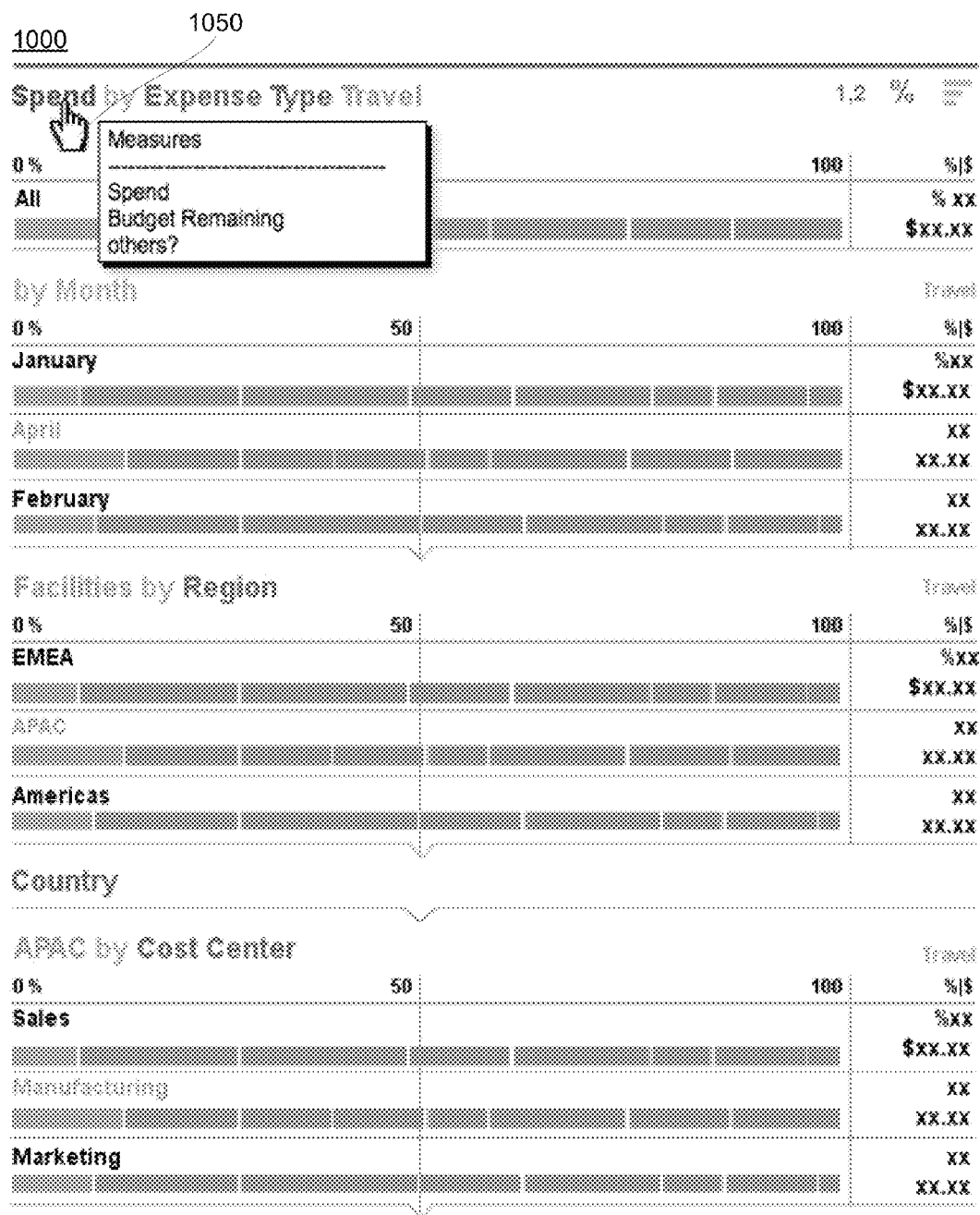

FIG. 24 shows a user controlled cursor 1050 can be used to select a dynamic pull-down menu by hovering over or selecting the lattice title to select a new lattice measure. In the example shown, the dynamic measures pull-down menu shows options for spend, budget remaining and other options. In some embodiments, the lattice interface 1000 will accommodate only one measure at a time for the rows and layers displayed.

Figure 25:
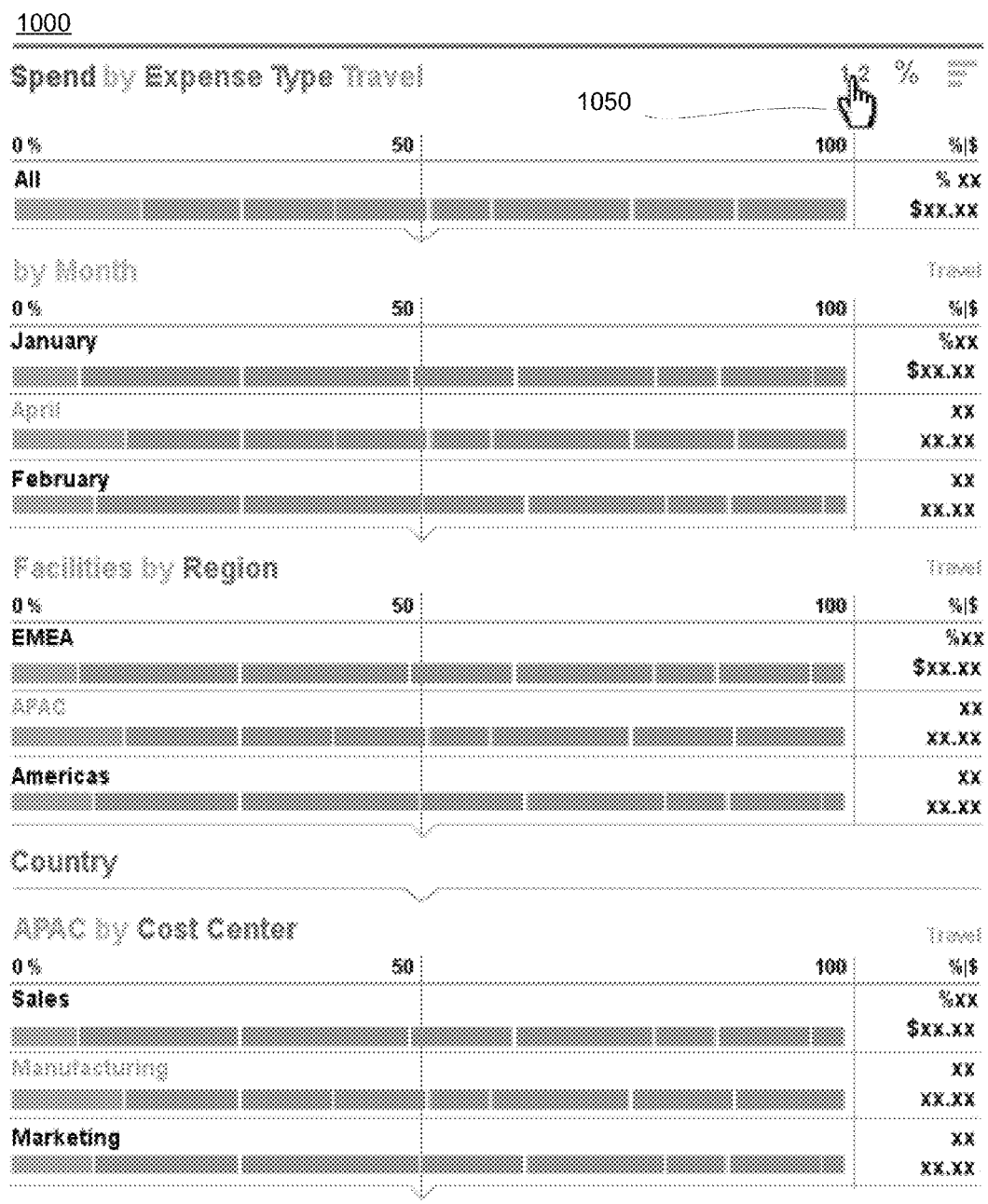

FIG. 25 shows user controlled cursor 1050 hovering over the sorting control button in the title section of the lattice interface 1000. By activating the sorting button, the rows can be sorted by size, alphabetically, or by custom order determined by a user. In some embodiments, sorting can be applied to items within the layers only, and does not affect the layer stack, in other embodiments, however, the sorting function can also sort the order of the cross dimension drawings of the slices within the strip charts. In related embodiments, individual sorts can be set from the layer tool can override the lattice sort. For example, the entire lattice can be sorted, or each layer can be sorted according to the options set by a user.

Figure 26:
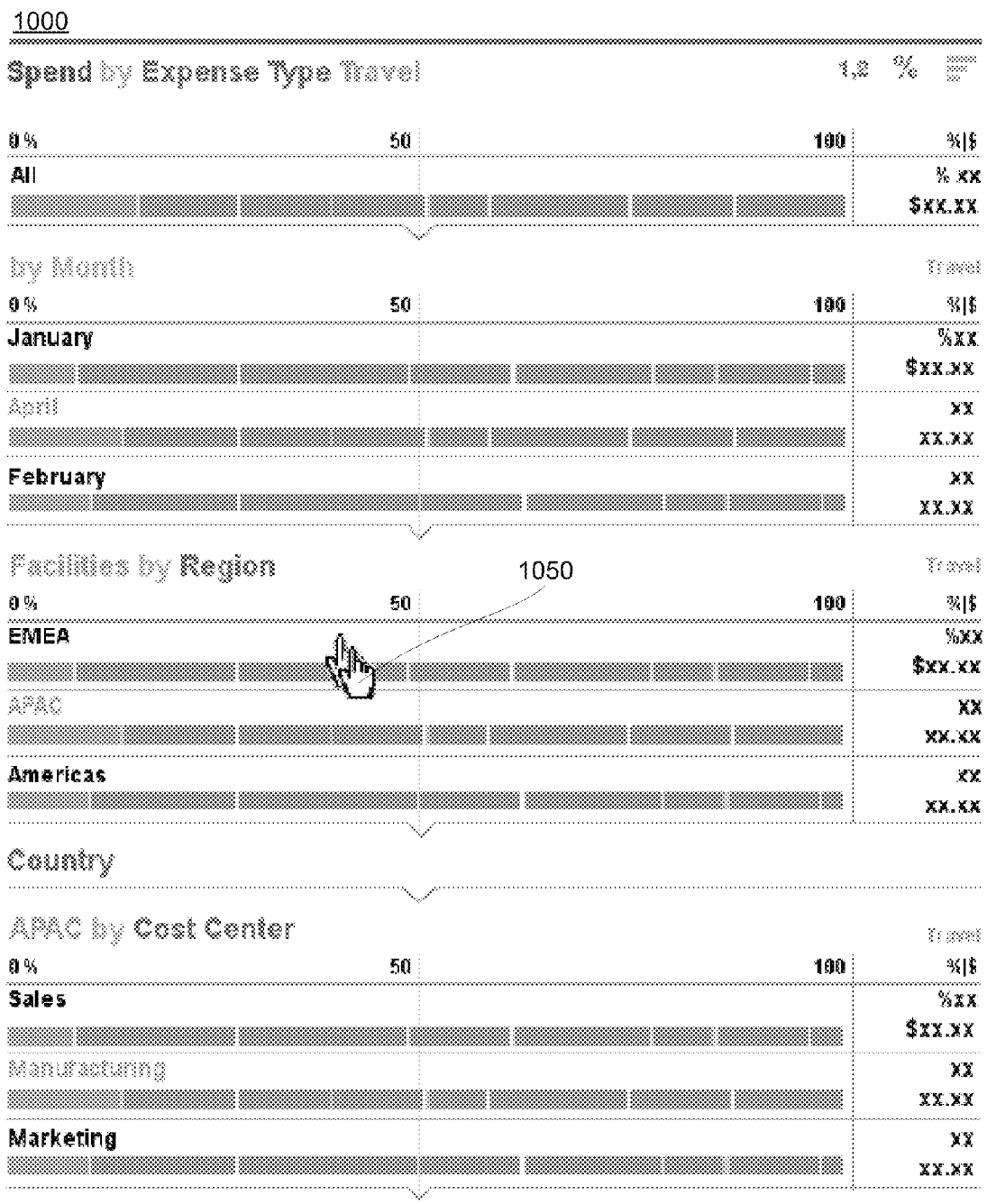
Figure 27:
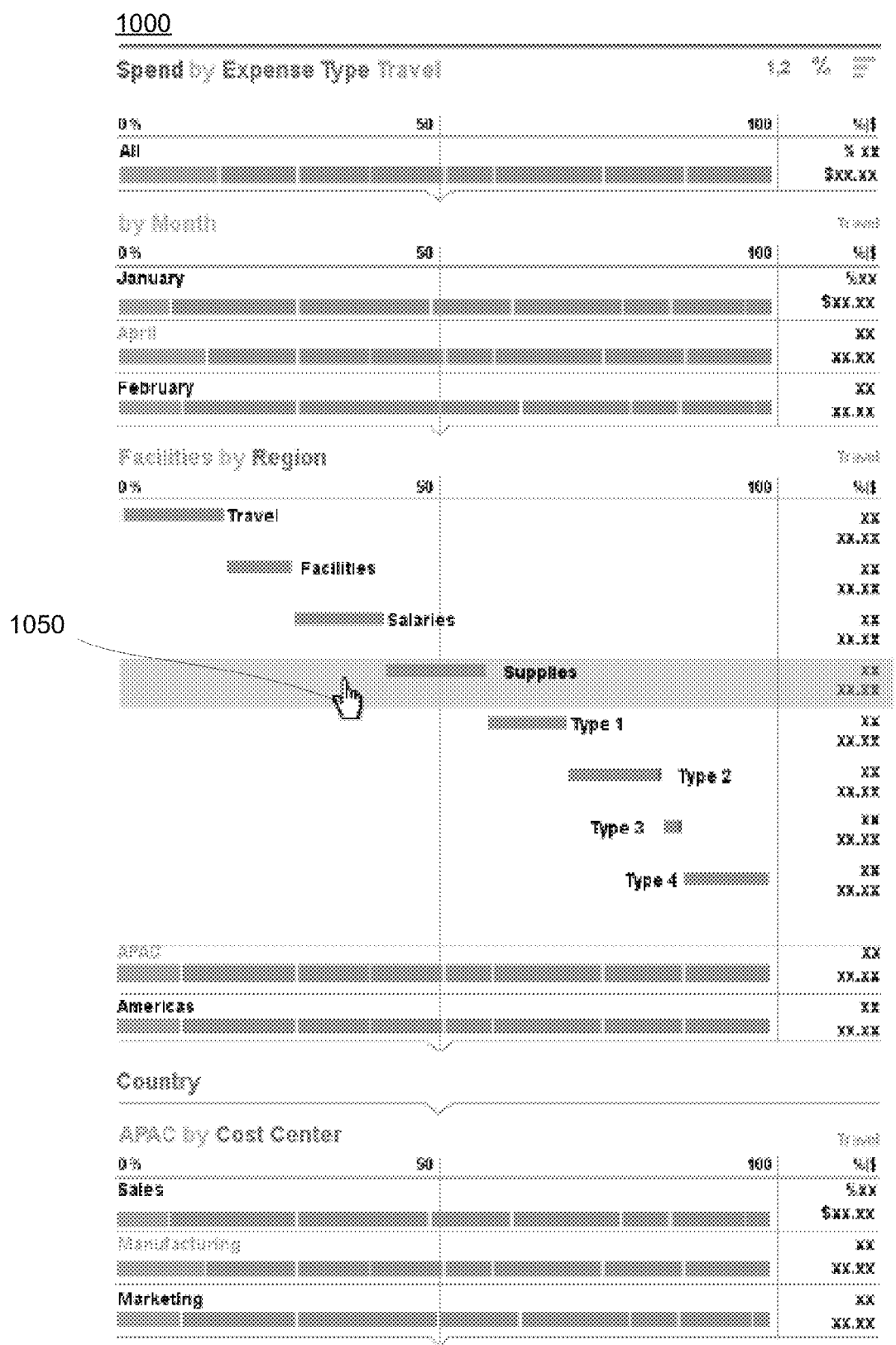

FIGS. 26 and 27 illustrate how lattice rows can be expanded via a double-click or other method to expand the data depicted in a strip chart or other graphic in a particular row. FIG. 26 illustrates the before image of the lattice interface 1000, and FIG. 27 shows the lattice interface 1000 with a particular row expanded. As shown, the EMEA row of the facilities by region layer is expanded to separate out and label the constituent parts and the values for that lattice row. In the particular example shown in FIG. 27, the EMEA lattice rows expanded to show the relative contributions of travel, facilities, salaries, supplies, type 1, type 2, type 3, and type 4. User controlled cursor 1050, can then be used to select a particular component of the expanded lattice row. In the example shown, the supplies component is selected.

FIG. 28 shows how the user controlled cursor 1050 can be used to invoke the view type option in the title section of the lattice interface 1000. The data view type menu includes options for amount comparison, time series, tables, and distribution. Each of these different options corresponds to a different chart format or view type. In the specific example shown in FIG. 28, the amount comparison view type is changed to a time series you type.

Figure 29:
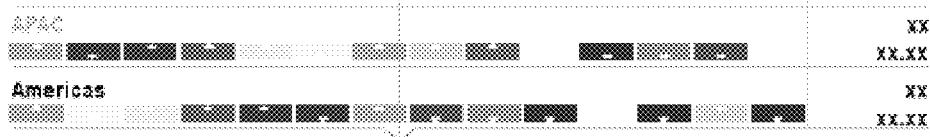

The resulting change from the amount comparison view type to the time series view type is shown in FIG. 29. In the iteration of lattice interface 1000 shown in FIG. 29, many parallel times series displays can be shown within rows using key lines. The key line maps a single measure over time, devises series and periods, then summarizes and normalizes the N values for each according to a tiered scale whose levels are indicated by color or shade. In some embodiments, there are a number of indicators that show changes up or growth, and a number of indicators that show changes down or shrinkage. Both the up and down indicators can include various measures, or measurements of change, in one direction or the other. Accordingly, data shown in this manner can quickly indicate to a user by a brief scan which values are increasing or decreasing at greater than expected rates. For example, a severe change down or shrinkage indicator can be rendered in bright red, thus quickly indicating to user that something needs to be explored. Likewise, a severe change or growth indicator can be rendered in bright green, thus also quickly indicating to a user that something needs to be explored and/or evaluated.

FIG. 30 shows that using the user controlled cursor 1050, the view type menu can be used to change the view to a table type display. In the table display shown in FIG. 30, the values for each of the lattice rows are shown as actual Figs. instead of percentage bar graphs or time series growth and shrinkage indicators.

Figure 31:
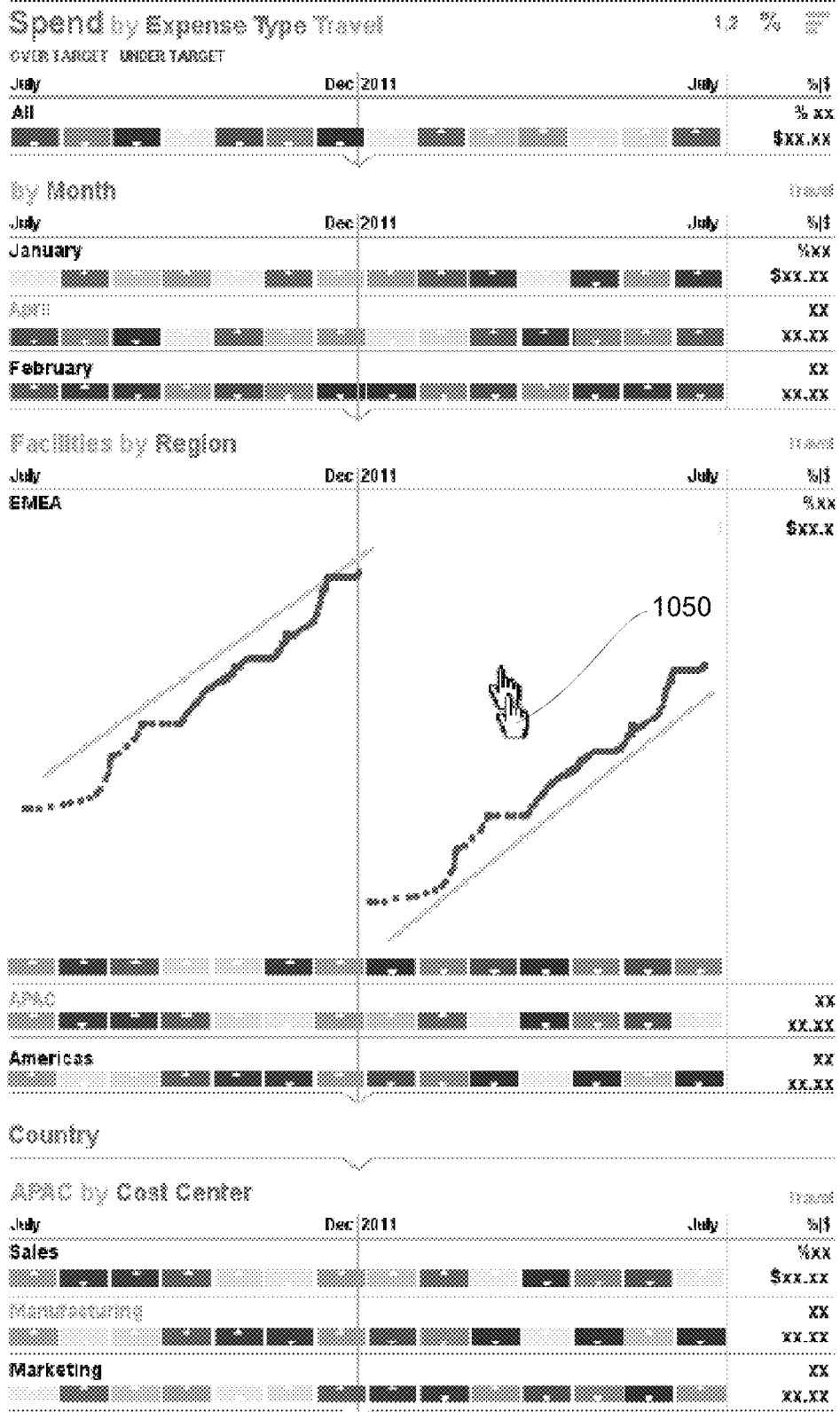
Figure 32:
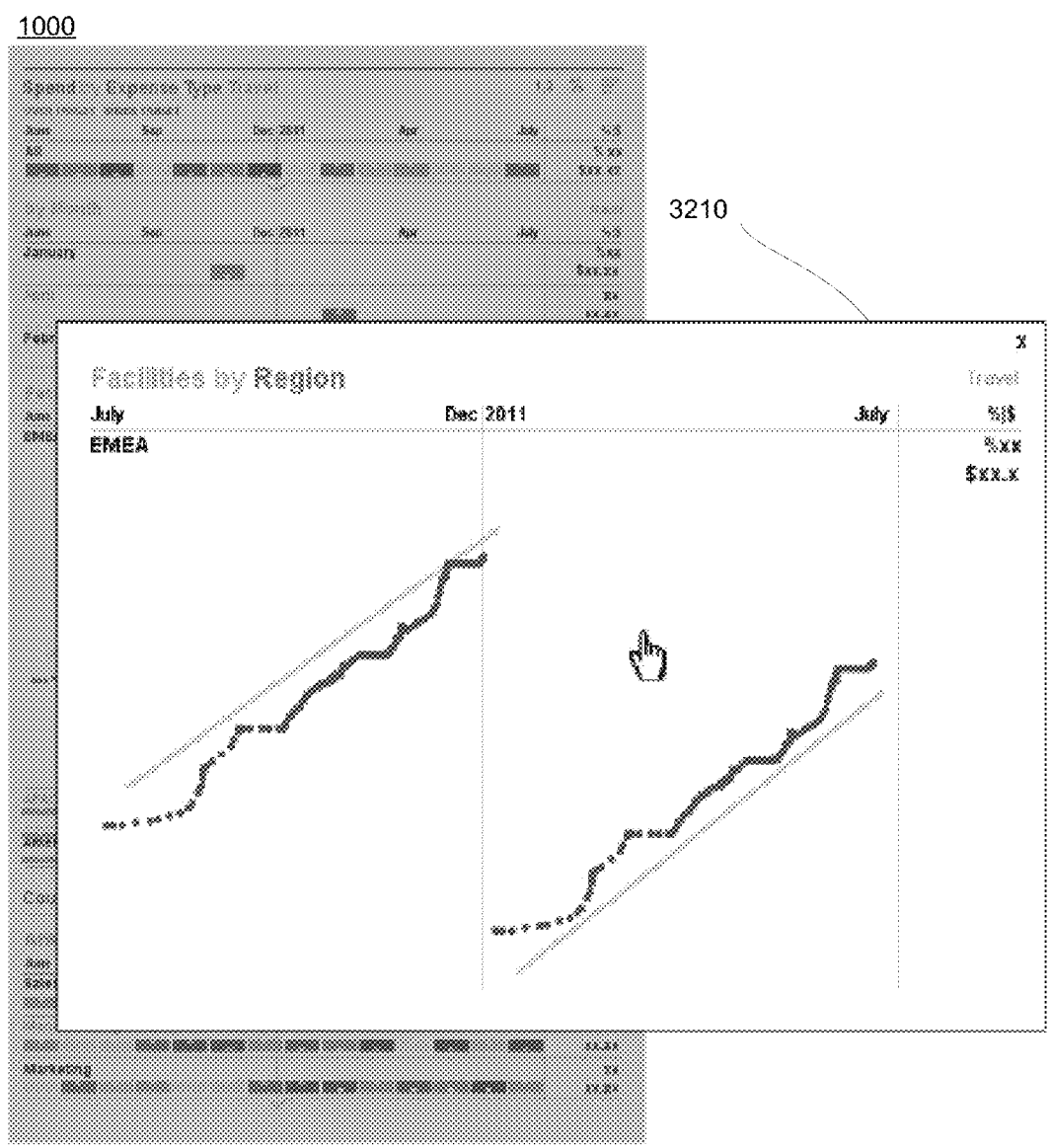

FIGS. 31 and 32 depict how the user controlled cursor 1050 can be used to open a "light box" view of various graphs or figures within the lattice interface 1000. As shown, any plot in the lattice interface 1000 can be opened into a large format light box view for showing more detail and more complex content, such as multiple dimensions. In some embodiments, such views can remain relatively simple, in favor of a full analysis scenario enabled by opening the underlying data set with a dedicated analysis or expiration tool or detailed analysis and search module, such as an OLAP software application. FIG. 32 shows lattice interface 1000 with the light box view 3210 in the enlarged view, or the "popped-out" version, of the graph that was selected in FIG. 31.

Figure 33:
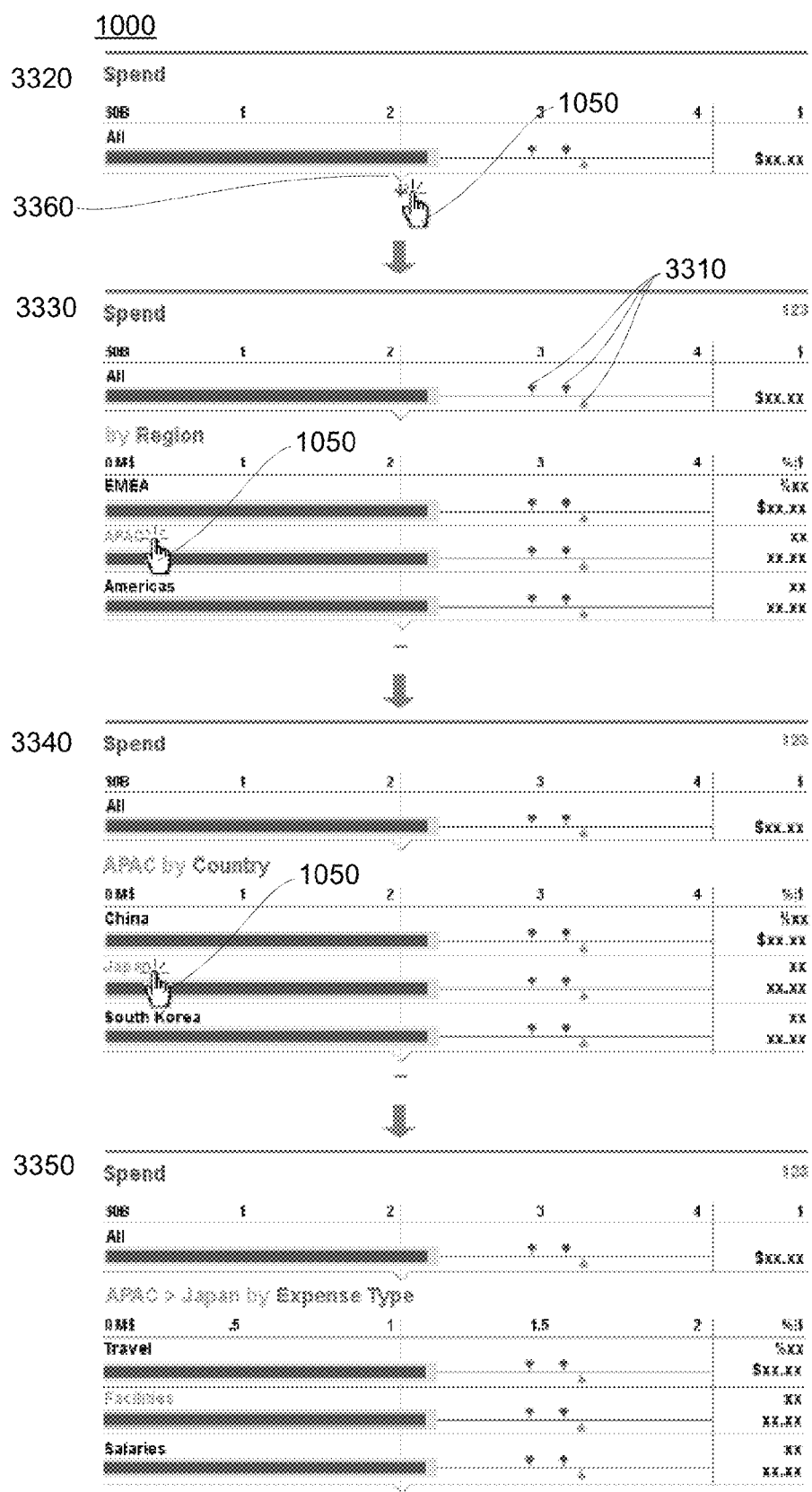

FIG. 33 illustrates how the user controlled cursor 150 can be used to expand a layer repeatedly to show increasingly more detail in lattice rows according to various embodiments the present disclosure. User controlled cursor 1050 can select the expansion bar or tool button 3360. The first time that the expansion bar or tool button 3360 is operated, spend layer 3320 is expanded into spend layer 3330 according to a predetermined drill down or analysis path. The predetermined drill down path can include predefined or default drill down paths set by a developer, an analyst, or informational services personnel. In other embodiments, the predetermined drill down path is in response to versions of the lattice interface 1000 previously edited, changed, or viewed by a user. In such embodiments, the augmented predetermined drill down path can be "sticky," such that the user does not need to repeat the previously performed changes or augmentations to the lattice interface 1000 to achieve the same results or displays as obtained in a previous analysis session using various embodiments of the present disclosure.

For example, the expansion bar or button 3360 operates to expand the lattice interface 1000 to include more layers or rows according to the predetermined drill down path. For example, spend layer 3320 can be expanded into spend layer 3330, which includes detailed lattice rows by region. User controlled cursor 1050 can be used to select a row within the newly created spend layer to change to change the measure of the layer. As shown, user controlled cursor 1050 can select the APAC row. In response to the selection of the APAC row, the lattice interface module can generate a new layer to add to or replace the previously generated layer. In this example, the APAC by country layer in spend layer 3340 replaces by region layer in spend layer 3330. In spend layer 3340, the user controlled cursor 1050 can be used to select Japan to augment the APAC by country to further drill down along the predetermined drill down path to show APAC>Japan by expense type in spend layer 3350.

In related embodiments, additional benchmark, predictions, forecasts, and expectation indicators 3310 can be added to charts to quickly indicate to users specific value goals.

Figure 34:
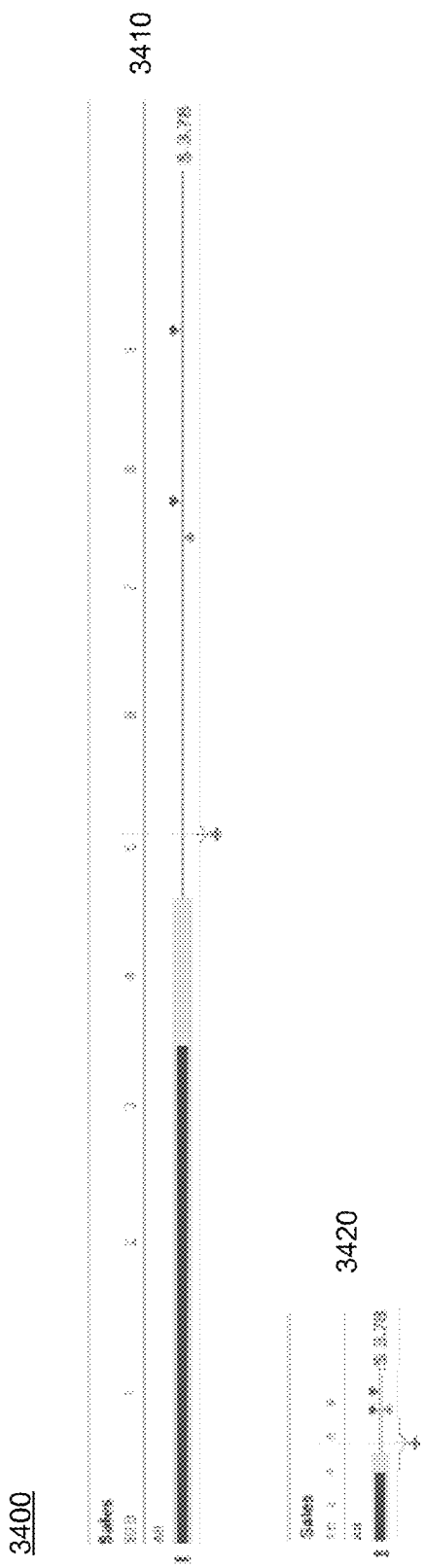

FIG. 34 is a depiction of a single lattice row depicting a single dimension graphical analysis tool. In this particular example, total sales and units of billions of dollars is shown as a bullet chart. Such one-dimensional bullet charts are advantageous in various embodiments of the present invention because they can easily be scaled without distortion while continuing to display intelligible information. As shown in FIG. 34, the elongated sales lattice row 3410 can be scaled down to the sales lattice row 3422 to advantageously save space in a lattice interface or dashboard configuration into which is loaded or displayed.

Figure 35:
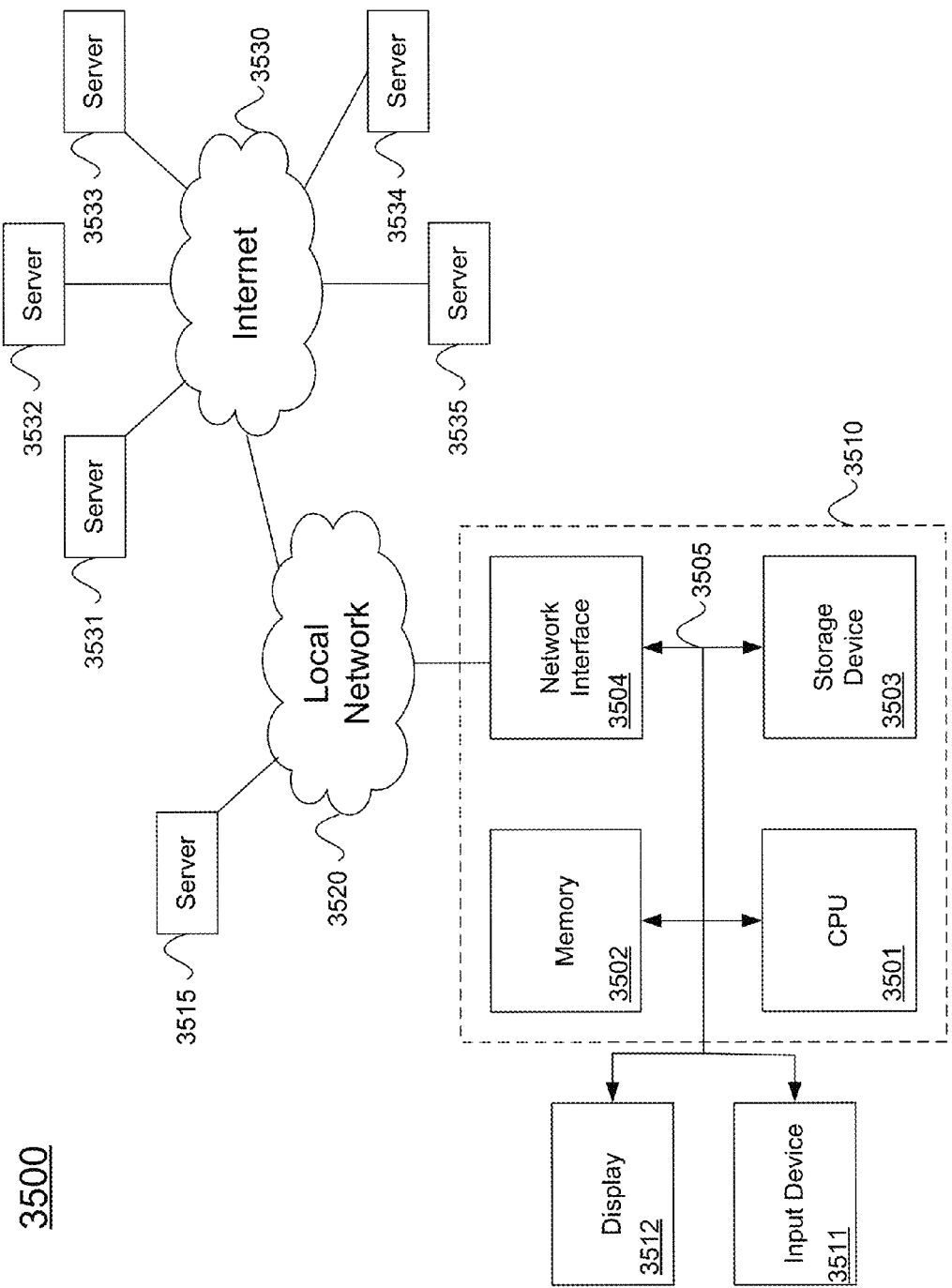
FIG. 35 illustrates the computer system that can be used to implement various embodiments of the present invention.

FIG. 35 illustrates an example computer system and networks that may be used to implement one embodiment of the present invention. Computer system 3510 includes a bus 3505 or other communication mechanism for communicating information, and a processor 3501 coupled with bus 3505 for processing information. Computer system 3510 also includes a memory 3502 coupled to bus 3505 for storing information and instructions to be executed by processor 3501, including instructions for performing the techniques described above. This memory may also be used for storing temporary variables or other intermediate information during execution of instructions to be executed by processor 3501. Possible implementations of this memory may be, but are not limited to, random access memory (RAM), read only memory (ROM), or both. A storage device 3503 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 3510 may be coupled via the same or different information bus, such as bus 3505, to a display 3512, such as a cathode ray tube (CRT) or liquid crystal display (LCD), for displaying information, such as the structured lattice interface to a computer user. An input device 3511 such as a keyboard and/or mouse is coupled to a bus for communicating information and command selections from the user to processor 3501. The combination of these components allows the user to communicate with the system.

Computer system 3510 also includes a network interface 3504 coupled with bus 3505. Network interface 3504 may provide two-way data communication between computer system 3510 and the local network 3520. The network interface 3504 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 3504 sends and receives electrical, electromagnetic, or optical signals that carry digital data streams representing various types of information.

Computer system 3510 can send and receive information, including messages or other interface actions, through the network interface 3504 to an Intranet or the Internet 3530. In the Internet example, software components or services may reside on multiple different computer systems 3510 or servers 3531 across the network. Software components described above may be implemented on one or more servers. A server 3531 may transmit messages from one component, through Internet 3530, local network 3520, and network interface 3504 to a component or container on computer system 3510, for example. Software components of a composite application may be implemented on the same system as other components, or on a different machine than other software components. This process of sending and receiving information between software components or one or more containers may be applied to communication between computer system 3510 and any of the servers 3531 to 3535 in either direction. It may also be applied to communication between any two servers 3531 to 3535.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, in a computer system, a multidimensional data set;
   parsing, in the computer system, the multidimensional data set according to a predetermined drill down path to generate a subset of the multidimensional data set, the predetermined drill down path specifying an order in which the multidimensional data set is presented in response to a sequence of user inputs; and displaying, by the computer system, a visual representation of the subset of the multidimensional data set according to the predetermined drill down path, wherein the visual representation includes a vertical stack of layers that provide analysis on a metric within the multidimensional data set, one of the vertical stack of layers comprising a plot of points of actual figures in a two-dimensional graph expandable into a box view, a different layer of the vertical stack of layers comprising a chart including the metric, wherein each layer within the vertical stack provides analysis on a different cross dimension of the metric, and wherein the plot, the chart, the cross dimension applied to each layer, as well as a scale of the cross dimension and/or alphanumeric information associated with the cross dimension, is based on the predetermined drill down path and the sequence of user inputs.

2. The method of claim 1 wherein the configuration of the vertical stack is based on the predetermined drill down path and a user profile associated with a user.

3. The method of claim 1, further comprising:
  detecting, by the computer system, a user input representative of selecting a first layer; and
  displaying, by the computer system, a toolbar menu containing a plurality of controls for altering the presentation of the first layer.

4. The method of claim 3, wherein the user input is hovering over a label of a first dimension that corresponds with the first layer.

5. The method of claim 3, wherein one control from the plurality of controls adjusts the position of the first layer in the vertical stack.

6. The method of claim 3, wherein one control from the plurality of controls adjusts a count of lattice rows that are displayed in the first layer.

7. The method of claim 6, wherein a first lattice row includes a plurality of parts that represent constituents of the lattice row, wherein selection of the lattice row expands and separates out the constituents of the lattice row into a plurality of sub-lattice rows and wherein selection of a constituent displays information on the constituent.

8. A non-transient computer readable medium comprising executable code that when executed by a processor in a computer system causes the processor to:
  receive a multidimensional data set;
  parse the multidimensional data set according to a predetermined drill down path to generate a subset of the multidimensional data set, the predetermined drill down path specifying an order in which the multidimensional data set is presented in response to a sequence of user inputs; and
  display a visual representation of the subset of the multidimensional data set according to the predetermined drill down path, wherein the visual representation includes a vertical stack of layers that provide analysis on a metric within the multidimensional data set, one of the vertical stack of layers comprising a plot of points of actual figures in a two-dimensional graph expandable into a box view, a different layer of the vertical stack of layers comprising a chart including the metric, wherein each layer within the vertical stack provides analysis on a different cross dimension of the metric, and wherein the plot, the chart the cross dimension applied to each layer, as well as a scale of the cross dimension and/or alphanumeric information associated with the cross dimension, is based on the predetermined drill down path and the sequence of user inputs.

9. The non-transient computer readable medium of claim 8 wherein the configuration of the vertical stack is based on the predetermined drill down path and a user profile associated with a user.

10. The non-transient computer readable medium of claim 8, further comprising executable code that when executed causes the processor to:
  detect a user input representative of selecting a first layer; and
  display a toolbar menu containing a plurality of controls for altering the presentation of the first layer.

11. The non-transient computer readable medium of claim 10, wherein one control from the plurality of controls adjusts the position of the first layer in the vertical stack.

12. The non-transient computer readable medium of claim 10, wherein one control from the plurality of controls adjusts a count of lattice rows that are displayed in the first layer.

13. The non-transient computer readable medium of claim 12, wherein a first lattice row includes a plurality of parts that represent constituents of the lattice row, wherein selection of the lattice row expands and separates out the constituents of the lattice row into a plurality of sub-lattice rows and wherein selection of a constituent displays information on the constituent.

14. A computer implemented system, comprising:
  a processor; and
  a non-transitory computer readable medium having stored thereon one or more programs, which when executed by the processor, causes the processor to:
    receive a multidimensional data set;
    parse, the multidimensional data set according to a predetermined drill down path to generate a subset of the multidimensional data set, the predetermined drill down path specifying an order in which the multidimensional data set is presented in response to a sequence of user inputs; and
    display a visual representation of the subset of the multidimensional data set to the predetermined drill down path, wherein the visual representation includes a vertical stack of layers that provide analysis on a metric within the multidimensional data set, one of the vertical stack of layers comprising a plot of points of actual figures in a two-dimensional graph expandable into a box view, a different layer of the vertical stack of layers comprising a chart including the metric, wherein each layer within the vertical stack provides analysis on a different cross dimension of the metric, and wherein the plot, the chart, the cross dimension applied to each layer, as well as a scale of the cross dimension and/or alphanumeric information associated with the cross dimension, is based on the predetermined drill down path and the sequence of user inputs.

15. The system of claim 14 wherein the configuration of the vertical stack is based on the predetermined drill down path and a user profile associated with a user.

16. The system of claim 14, further comprising:
  detecting, by the computer system, a user input representative of selecting a first layer; and
  displaying, by the computer system, a toolbar menu containing a plurality of controls for altering the presentation of the first layer.

17. The system of claim 16, wherein the user input is hovering over a label of a first dimension that corresponds with the first layer.

18. The system of claim 16, wherein one control from the plurality of controls adjusts the position of the first layer in the vertical stack.

19. The system of claim 16, wherein one control from the plurality of controls adjusts a count of lattice rows that are displayed in the first layer.

20. The system of claim 19, wherein a first lattice row includes a plurality of parts that represent constituents of the lattice row, wherein selection of the lattice row expands and separates out the constituents of the lattice row into a plurality of sub-lattice rows and wherein selection of a constituent displays information on the constituent.

* * * * *